United States Patent
Sawasato et al.

(12)

(10) Patent No.: US 11,760,825 B2
(45) Date of Patent: Sep. 19, 2023

(54) BLOCK COPOLYMER COMPOSITION, HEAT SHRINK FILM USING SAME, AND PACKAGE PROVIDED WITH HEAT SHRINK FILM

(71) Applicant: DENKA COMPANY LIMITED, Tokyo (JP)

(72) Inventors: Tadashi Sawasato, Ichihara (JP); Yuya Nakamura, Ichihara (JP); Jun Yoshida, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 465 days.

(21) Appl. No.: 17/264,149

(22) PCT Filed: Jul. 26, 2019

(86) PCT No.: PCT/JP2019/029377
§ 371 (c)(1),
(2) Date: Jan. 28, 2021

(87) PCT Pub. No.: WO2020/026969
PCT Pub. Date: Feb. 6, 2020

(65) Prior Publication Data
US 2021/0284781 A1    Sep. 16, 2021

(30) Foreign Application Priority Data
Aug. 1, 2018   (JP) .................................. 2018-144687

(51) Int. Cl.
| | |
|---|---|
| *C08F 236/10* | (2006.01) |
| *C08F 297/04* | (2006.01) |
| *B65D 65/04* | (2006.01) |
| *C08J 5/18* | (2006.01) |
| *C08F 236/08* | (2006.01) |
| *C08F 293/00* | (2006.01) |
| *C08F 236/06* | (2006.01) |

(52) U.S. Cl.
CPC ............ *C08F 297/04* (2013.01); *B65D 65/04* (2013.01); *C08F 236/10* (2013.01); *C08J 5/18* (2013.01); *C08F 236/06* (2013.01); *C08F 236/08* (2013.01); *C08F 293/00* (2013.01); *C08J 2203/16* (2013.01); *C08J 2353/02* (2013.01)

(58) Field of Classification Search
None
See application file for complete search history.

(56) References Cited

U.S. PATENT DOCUMENTS

| | | |
|---|---|---|
| 6,107,411 A | 8/2000 | Toya et al. |
| 2004/0102576 A1 | 5/2004 | Matsui et al. |
| 2005/0089702 A1 | 4/2005 | Matsui et al. |
| 2008/0134642 A1 | 6/2008 | Brown et al. |
| 2013/0331519 A1 | 12/2013 | Sawasato et al. |

FOREIGN PATENT DOCUMENTS

| | | |
|---|---|---|
| JP | S52-115855 A | 9/1977 |
| JP | H02-049014 A | 2/1990 |
| JP | H11-158241 A | 6/1999 |
| JP | 2003-094520 A | 4/2003 |
| JP | 2003-313259 A | 11/2003 |
| JP | 2004-099749 A | 4/2004 |
| JP | 2004099749 A * | 4/2004 |
| JP | 2004-269743 A | 9/2004 |
| JP | 2005-213520 A | 8/2005 |
| JP | 2013-173958 A | 9/2013 |
| JP | 2016-216541 A | 12/2016 |
| WO | 2012/117964 A1 | 9/2012 |

OTHER PUBLICATIONS

Oct. 15, 2019 Search Report issued in International Patent Application No. PCT/JP2019/029377.
Aug. 5, 2021 Extended Search Report issued in European Patent Application No. 19844691.6.

* cited by examiner

*Primary Examiner* — Richard A Huhn
(74) *Attorney, Agent, or Firm* — Oliff PLC

(57) ABSTRACT

A block copolymer composition containing at least one type of block copolymer component obtained by using a vinyl aromatic hydrocarbon and a conjugated diene, wherein the block copolymer composition satisfies the conditions (1) to (3) indicated below. (1) The weight-average molecular weight is at least 100000 and at most 300000, and the conjugated diene content is at least 18 mass % and at most 35 mass %. (2) The vinyl aromatic hydrocarbon block percentage is at least 80% and at most 100% relative to the total amount of the vinyl aromatic hydrocarbon. (3) At least 30 mass % and at most 60 mass % of block copolymer components having a conjugated diene content of at least 30 mass % are included.

14 Claims, No Drawings

BLOCK COPOLYMER COMPOSITION, HEAT SHRINK FILM USING SAME, AND PACKAGE PROVIDED WITH HEAT SHRINK FILM

TECHNICAL FIELD

The present invention relates to a block copolymer composition, a heat-shrink film using the same, and a package provided with the heat-shrink film.

BACKGROUND

Block copolymer compositions containing vinyl aromatic hydrocarbons and conjugated dienes are widely used as raw materials for heat-shrink films used in shrink packaging. The physical properties sought in the aforementioned heat-shrink films include, for example, natural-shrinkage resistance for suppressing the phenomenon in which a film naturally shrinks when the film is stored in a temperature environment that is not controlled, and aside therefrom, properties such as rigidity for suppressing cases in which, when a shrink label is used to cover a package in the form of a sleeve, the film is attached in a bent state due to weight being placed on the shrink label, and low heat-shrink stress properties (also called low orientation-relaxation stress properties) for suppressing the occurrence of attachment defects caused by the film suddenly shrinking due to steam or hot air, thereby forming wrinkles or bending. Patent Documents 1 to 4 describe that, by using block copolymers containing vinyl aromatic hydrocarbons and conjugated dienes wherein the copolymers have specific polymer structures for the purpose of satisfying these various sought properties, these physical properties can be obtained in a well-balanced manner.

In recent years, the heat-shrink films that are used in shrink packaging are required to be adapted to various package shapes and attachment methods, and there is also a demand to realize films having appearances with excellent decorative properties and the like. Thus, a heat-shrink film that satisfies various physical properties aside from the above-mentioned natural-shrinkage resistance, rigidity and heat-shrink stress properties, such as low-temperature heat-shrinkability, strength, transparency and printability, is sought.

One property that is considered to be important for shrink packaging is the shrink finish when attached. A specific example of the shrink finish is that, when shrink-packaged, the film is not wrinkled, loose, or the like, and the film is in tight contact with the package, such as a bottle, without any gaps along the entire outline of the package. Additionally, in connection with the foregoing, one factor affecting the shrink finish is the smallness of the size change at the time of shrink attachment, mainly in the direction (hereinafter abbreviated to as the "longitudinal direction" or the "MD") orthogonal to the shrinking direction (the shrink direction mainly contributing to tight contact with the package). Therefore, when preparing a heat-shrink film, measures are generally implemented in the processing conditions in order to reduce size changes, such as by intentionally stretching the film in the longitudinal direction.

As designs become more diversified, in order to be able to flexibly adapt to various package shapes and shrink attachment methods, a heat-shrink film in which the size change in the longitudinal direction is further reduced in the temperature region used during shrink attachment is sought. However, by controlling only the stretch conditions as mentioned above, it is difficult to stably reduce size changes in the wide temperature region from 70 to 100° C. used during shrink attachment. Thus, improvements in the raw materials have been desired.

Meanwhile, it is known that, when printing on a film during a shrink label production process, if a chemical attack by an organic solvent used as a diluting solvent for the ink is too strong, then orientation relaxation occurs at the surfaces contacting the organic solvent, cracks occurring in the film become more prominent, and as a result thereof, the strength decreases (the elasticity decreases). In recent years, as shrink labels have become thinner, the aforementioned solvent resistance to the diluting solvents for ink has been sought in raw materials more than in the past.

CITATION LIST

Patent Literature

Patent Document 1: JP H11-158241 A
Patent Document 2: JP 2005-213520 A
Patent Document 3: JP 2003-313259 A
Patent Document 4: WO 2012/117964 A1

SUMMARY OF INVENTION

Technical Problem

The present invention addresses the problem of providing a block copolymer composition and a heat-shrink film using the same, and a package to which the heat-shrink film is attached, wherein the block copolymer composition can form a heat-shrink film in which the size change in the longitudinal direction orthogonal to the shrinkage direction is stably small in the temperature range used at the time of shrink attachment and in which whitening of the film does not tend to occur as a result of chemical attacks by organic solvents at the time of printing, while maintaining rigidity, transparency and shrink performance in the shrinkage direction.

Solution to Problem

The present invention is characterized by the features indicated below.
[1] A block copolymer composition containing at least one type of block copolymer component obtained by using a vinyl aromatic hydrocarbon and a conjugated diene, wherein the block copolymer composition satisfies the following conditions (1) to (3):
(1) having a weight-average molecular weight of at least 100000 and at most 300000, and a conjugated diene content of at least 18 mass % and at most 35 mass %;
(2) having a vinyl aromatic hydrocarbon block percentage of at least 80% and at most 100% relative to the total amount of the vinyl aromatic hydrocarbon; and
(3) including at least 30 mass % and at most 60 mass % of block copolymer components having a conjugated diene content of at least 30 mass %.
[2] The block copolymer composition according to [1], wherein the at least one type of block copolymer component contains a hard block mainly comprising the vinyl aromatic hydrocarbon and a soft block mainly comprising the conjugated diene.
[3] The block copolymer composition according to [1] or [2], containing a block copolymer component having at least one type of branch chain selected from among the following formulas (i) to (iv):

(i) X-B-A;
(ii) X-B-C-A;
(iii) X-A-B-A; and
(iv) X-A-B-C-A;
[wherein X represents a coupling agent, A represents a hard block containing at least 94 mass % vinyl aromatic hydrocarbons, B represents a soft block containing at least 80 mass % conjugated dienes, and C represents a copolymer block containing vinyl aromatic hydrocarbons and conjugated dienes, and not satisfying the conditions of one of A and B.]

[4] The block copolymer composition according to [3], containing a block copolymer component having a branch chain with a conjugated diene content of at least 30 mass %, and a branch chain with a conjugated diene content less than 20 mass %.

[5] The block copolymer composition according to any one of [1] to [4], wherein the vinyl aromatic hydrocarbon is at least one type of vinyl aromatic hydrocarbon selected from the group consisting of vinyl monocyclic aromatic hydrocarbons and derivatives thereof, and vinyl polycyclic aromatic hydrocarbons and derivatives thereof.

[6] The block copolymer composition according to any one of [1] to [4], wherein the vinyl aromatic hydrocarbon is at least one type of vinyl aromatic hydrocarbon selected from the group consisting of vinyl dicyclic aromatic hydrocarbons, vinyl tricyclic aromatic hydrocarbons, and vinyl tetracyclic aromatic hydrocarbons.

[7] The block copolymer composition according to any one of [1] to [6], wherein the vinyl aromatic hydrocarbon is at least one type of vinyl aromatic hydrocarbon selected from the group consisting of styrene, o-methylstyrene, p-methylstyrene, p-tert-butylstyrene, 2,4-dimethylstyrene, 2,5-dimethylstyrene, α-methylstyrene, vinylnaphthalene, and vinylanthracene.

[8] The block copolymer composition according to any one of [1] to [5] and [7], wherein the vinyl aromatic hydrocarbon is styrene.

[9] The block copolymer composition according to any one of [1] to [8], wherein the conjugated diene is a C4-C12 diene.

[10] The block copolymer composition according to any one of [1] to [9], wherein the conjugated diene is at least one type of conjugated diene selected from the group consisting of C4-C10 dienes, C4-C8 dienes, and C4-C6 dienes.

[11] The block copolymer composition according to any one of [1] to [10], wherein the conjugated diene is at least one type of conjugated diene selected from the group consisting of 1,3-butadiene (butadiene), 2-methyl-1,3-butadiene (isoprene), 1,3-pentadiene, 2,3-dimethyl-1,3-butadiene, and 1,3-hexadiene.

[12] The block copolymer composition according to any one of [1] to [11], wherein the conjugated diene is 1,3-butadiene (butadiene).

[13] A heat-shrink film obtained by using the block copolymer composition according to any one of [1] to [12].

[14] A package provided with the heat-shrink film according to [13].

Effects of Invention

The present invention is able to provide a block copolymer composition, a heat-shrink film using the same, and a package to which the heat-shrink film is attached, wherein the block copolymer composition can form a heat-shrink film in which the size change in the longitudinal direction orthogonal to the shrinkage direction is stably small in the temperature range used at the time of shrink attachment and in which whitening of the film does not tend to occur as a result of chemical attacks by organic solvents at the time of printing, while maintaining rigidity, transparency and shrink performance in the shrinkage direction. As a result thereof, it is possible to provide a shrink package having an attractive appearance, in which there are few occurrences of wrinkles at the time of shrink packaging, film tears due to printing, and the like, without depending on various package shapes and attachment methods.

DESCRIPTION OF EMBODIMENTS

Hereinafter, an embodiment of the present invention will be explained in detail. The present invention is not limited to the embodiment below and may be implemented by adding appropriate modifications within a range not inhibiting the effects of the present invention. In the present description, numerical values presented in the form "A-B" represent a range equal to or greater than A and equal to or less than B.

[Block Copolymer Composition]

The block copolymer composition according to the present embodiment contains at least one type of block copolymer component obtained by using a vinyl aromatic hydrocarbon and a conjugated diene, preferably a block copolymer component formed from a vinyl aromatic hydrocarbon and a conjugated diene.

In the present description, a "block copolymer component" refers to a linear or branched block copolymer molecular chain. Additionally, in the present description, the term "block copolymer composition" includes not only cases in which multiple block copolymer components (block copolymer chains) are contained, but also cases in which only one type of block copolymer component (block copolymer chain) is contained.

Vinyl aromatic hydrocarbons that can be used to produce the block copolymer composition include vinyl monocyclic aromatic hydrocarbons and derivatives thereof, and vinyl polycyclic aromatic hydrocarbons and derivatives thereof. Vinyl polycyclic aromatic hydrocarbons include vinyl dicyclic aromatic hydrocarbons, vinyl tricyclic aromatic hydrocarbons, vinyl tetracyclic aromatic hydrocarbons, and the like. Vinyl monocyclic aromatic hydrocarbons and derivatives thereof include, for example, styrene, o-methylstyrene, p-methylstyrene, p-tert-butylstyrene, 2,4-dimethylstyrene, 2,5-dimethylstyrene, α-methylstyrene, and the like. Vinyl dicyclic aromatic hydrocarbons include vinylnaphthalene and the like. Vinyl tricyclic aromatic hydrocarbons include vinylanthracene and the like. Among vinyl aromatic hydrocarbons, styrene and/or α-methylstyrene are preferred, and styrene is more preferred.

Conjugated dienes that can be used to produce the block copolymer composition include, for example, C4-C12 dienes and the like, among which C4-C10 dienes are preferred, C4-C8 dienes are more preferred, and C4-C6 dienes are even more preferred. C4 dienes include 1,3-butadiene (butadiene) and the like. C5 dienes include 2-methyl-1,3-butadiene (isoprene), 1,3-pentadiene, and the like. C6 dienes include 2,3-dimethyl-1,3-butadiene, 1,3-hexadiene, and the like. Among conjugated dienes, 1,3-butadiene and/or isoprene are preferred, and 1,3-butadiene (butadiene) is more preferred.

The block copolymer composition can be produced by polymerizing vinyl aromatic hydrocarbons and conjugated diene monomers in a dehydrated organic solvent, using an organic lithium compound as the initiator, in the co-presence of a randomizer as needed. As the organic solvent, an aliphatic hydrocarbon, an alicyclic hydrocarbon, an aromatic hydrocarbon, or the like may be used. Aliphatic hydrocarbons include C4-C12 aliphatic hydrocarbons and the like, among which C4-C10 aliphatic hydrocarbons are preferred, and C4-C8 aliphatic hydrocarbons are more preferred. C4-C8 aliphatic hydrocarbons include butane, pentane, hexane, isopentane, heptane, octane, iso-octane, and the like. Alicyclic hydrocarbons include C4-C12 alicyclic hydrocarbons and the like, among which C4-C10 alicyclic hydrocarbons are preferred, C4-C8 alicyclic hydrocarbons are more preferred, and C4-C6 alicyclic hydrocarbons are even more preferred. C4-C6 alicyclic hydrocarbons include cyclohexane, methylcyclohexane, ethylcyclohexane, and the like. Aromatic hydrocarbons include C4-C12 aromatic hydrocarbons and the like, among which C4-C10 aromatic hydrocarbons are preferred, and C4-C8 aromatic hydrocarbons are more preferred. C4-C8 aromatic hydrocarbons include benzene, toluene, ethylbenzene, xylene, and the like. Among organic solvents, cyclohexane is preferred.

Organic lithium compounds are organic compounds in which one or more lithium atoms are bonded in each molecule, including C2-C12 organic lithium compounds and the like, among which C2-C10 organic lithium compounds are preferred, C2-C8 organic lithium compounds are more preferred, and C2-C6 organic lithium compounds are even more preferred. As C2-C6 organic lithium compounds, it is possible to use, for example, monofunctional organic lithium compounds such as ethyllithium, n-propyllithium, n-butyllithium, sec-butyllithium, tert-butyllithium, and the like, as well as polyfunctional organic lithium compounds such as hexamethylene dilithium, butadienyl dilithium, isoprenyl dilithium, and the like. Among the above, n-butyllithium is preferred. Regarding the timing at which the above-mentioned initiator is to be added, the initiator may be added in a single batch in the initial stages at which polymerization starts, or may be added during polymerization.

As the randomizer, tetrahydrofuran (THF) is mainly used. However, aside therefrom, it is possible to use ethers, amines, thioethers, phosphoramides, alkylbenzene sulfonic acid salts, potassium or sodium alkoxides, and the like. Ethers include C2-12 ethers and the like. C2-C12 ethers include, for example, dimethyl ether, diethyl ether, diphenyl ether, diethylene glycol dimethyl ether, diethylene glycol dibutyl ether, and the like. As amines, it is possible to use tertiary amines, for example, trimethylamine, triethylamine, and tetramethyl ethylenediamine, as well as inner cyclic amines and the like. Aside therefrom, it is possible to use, as the randomizer, triphenylphosphine, hexamethylphosphoramide, potassium or sodium alkylbenzene sulfonate, potassium or sodium butoxide, and the like.

The added amount of these randomizers should be 10 parts by mass or less, preferably 0.001-8 parts by mass, relative to 100 parts by mass of all monomers that were charged. The time of addition may be before the polymerization reaction starts, or may be during polymerization. Additionally, more may be added later as needed.

The block copolymer composition can be obtained by a generally known method such as that described in JP 2003-313259 A or the like, specifically, by combining multiple addition modes selected from among the addition, respectively, of the vinyl aromatic hydrocarbons alone or of the conjugated dienes alone, the addition of both the vinyl aromatic hydrocarbons and the conjugated dienes, or the like, in the presence of the initiator. In each addition step, the timing at which the monomers are added is preferably after the monomers have been entirely consumed.

The block copolymer obtained by the above-described method may be allowed to complete the reaction while still having a linear structure, or may be converted to a branched structure by adding a coupling agent and allowing the reaction to progress in a state in which there are active terminals (in a living state).

As the coupling agent, it is possible to use a compound having three or more functional groups, the functional groups being at least one or more types selected from among epoxy groups, ester groups, carboxyl groups, ketone groups, vinyl groups, and silyl ether groups. Among the above, tetrachlorosilane, tetraalkoxysilane, vinyltrichlorosilane, vinyltrialkoxysilane, epoxidized soybean oil, epoxidized linseed oil, and the like can generally be used, and among these, epoxidized soybean oil, epoxidized linseed oil, and tetraalkoxysilane are preferred. As the addition mode, the coupling agent may be added alone, or the coupling agent may be added after being diluted with the aforementioned dehydrated organic solvent.

To the block copolymer composition obtained in this manner, a polymerization stopper such as water, alcohol, carbon dioxide, or the like is added in an amount sufficient to deactivate the active terminals, thereby deactivating the terminals and completing the polymerization. As the method for recovering the block copolymer composition from the block copolymer composition solution, it is possible to use any method, such as a method of pouring this solution into a poor solvent such as methanol to cause precipitation, a method of evaporating the solvent by means of a heating roller or the like to cause precipitation (drum dryer method), a method of concentrating the solution by means of a concentrator and thereafter removing the solvent with a vent-type extruder, and a method of dispersing the solution in water and blowing steam therein to heat and remove the solvent (steam stripping method). The block copolymer composition obtained in this manner contains at least one type of block copolymer component.

Methods for obtaining a block copolymer composition containing multiple types of block copolymer components include methods in which the active terminals are partially deactivated during the polymerization step, or an initiator, a coupling agent, or the like is added during the polymerization step, thereby obtaining a mixed solution containing multiple types of block copolymer components, and the like. By removing the solvent after the solutions have been mixed, it is possible to obtain a block copolymer composition containing multiple block copolymer components.

The block copolymer composition can be formed as a mixture containing multiple types of block copolymer compositions. Methods for obtaining mixtures including multiple types of block copolymer compositions include a method in which block copolymer composition solutions that have been respectively polymerized in different reaction vessels are deactivated as needed, and thereafter mixed and homogenized. By removing the solvent after the solutions have been mixed, a mixture of block copolymer compositions is obtained. Aside therefrom, it is possible to use a method in which pellets of block copolymer compositions from which the solvents have already been removed are pre-mixed, and thereafter, melt-mixed and homogenized in a screw-type extruder provided with a kneading function.

Other resin components may also be added, as needed, at the time the pellets are pre-mixed.

The block copolymer composition satisfies the following conditions (1) to (3):

(1) having a weight-average molecular weight of at least 100000 and at most 300000, and a conjugated diene content of at least 18 mass % and at most 35 mass %;

(2) having a vinyl aromatic hydrocarbon block percentage of at least 80% and at most 100% relative to the total amount of the vinyl aromatic hydrocarbon; and (3) including at least 30 mass % and at most 60 mass % of block copolymer components having a conjugated diene content of at least 30 mass %.

By satisfying the above-mentioned structural characteristics, when a heat-shrink film is formed by the extrusion molding method to be described below, the size change in the MD (corresponding to the aforementioned longitudinal direction) when heat-shrinking the film is stably low in the temperature range from 70–100° C., and defects such as wrinkling and the like due to size changes in the longitudinal direction do not tend to occur when the film is used as a shrink label, thereby allowing a good shrink finish to be realized. This is inferred to be due to the fact that a lamellar microphase separation structure that is highly parallel to the manufacturing direction (abbreviated as MD) was able to be obtained.

In addition to the matters described above, by satisfying the above-mentioned structural characteristics, when a heat-shrink film is formed by the extrusion molding method to be described below, whitening due to chemical attacks by organic solvents that are used when printing does not tend to occur, and the solvent resistance increases. This is inferred to be due to the fact that the block copolymer molecular chains do not become excessively oriented, thereby reducing the effects of orientation relaxation by solvents and suppressing the whitening of the film. Furthermore, in addition to the aforementioned characteristics, the block copolymer composition according to the present embodiment has the characteristic of having a lamellar microphase separation structure when used to form a heat-shrink film. Thus, it is possible to satisfy the solvent resistance properties that are needed in practice, such as having excellent film elasticity, and the film being resistant to tearing even after printing. Hereinafter, the conditions (1) to (3) will be explained in detail.

(1) The block copolymer composition has a weight-average molecular weight (Mw) of 100000-300000, more preferably 100000-250000. If the Mw is lower than 100000, then the flowability becomes too high when the film is extrusion molded, the width and thickness of the film tend to lose uniformity, and the mechanical strength also tends to become lower. If the Mw exceeds 300000, then the flowability becomes too low, and resin deterioration tends to occur due to resin temperature increases associated with the generation of excessive shear stress. Regarding the preferred flowability range, the melt mass-flow rate (MFR) measured at 200° C. with a load of 5 kg in accordance with the ISO1133 standard is preferably 1-30 g/10 min, and more preferably 5-15 g/10 min.

The weight-average molecular weight (Mw) is obtained from the polystyrene-equivalent molecular weight measured with a differential refractive index (RI) detector by means of gel permeation chromatography (GPC) using a normal column. The polystyrene-equivalent molecular weights can be computed by using standard polystyrenes with known molecular weights to prepare calibration lines based on the relationship between molecular weight and the time required for detection, and then computing the polystyrene-equivalent molecular weights from the molecular weight distributions of the block copolymer compositions obtained by using the calibration lines.

The conjugated diene content in the block copolymer composition is at least 18 mass % and at most 35 mass %, and more preferably at least 20 mass % and at most 30 mass %. By setting the conjugated diene content to be within the above-mentioned range, the strength and rigidity of the film can be maintained, while also obtaining a lamellar microphase separation structure that is parallel to the MD (the direction orthogonal to the shrink direction, also referred to as the longitudinal direction) when a heat-shrink film is formed. As a result thereof, size changes in the longitudinal direction can be made small in the temperature range used at the time of shrink attachment, while maintaining the strength and rigidity of the film. If the conjugated diene content is less than 18 mass %, then the strength becomes lower and the film tends to become brittle, in addition to which a lamellar microphase separation structure parallel to the MD (corresponding to the aforementioned longitudinal direction), which is a characteristic of the present invention, becomes difficult to obtain when a heat-shrink film is formed. If the conjugated diene content exceeds 35 mass %, then the rigidity of the heat-shrink film becomes too low and the film becomes difficult to stretch, in addition to which, in the case of shrink packaging by means of a sleeve method (a method in which a tubular shrink film is used to cover an attachment target, and thereafter shrink-attached), the film tends to bend due to weight, causing attachment defects with respect to the package.

The conjugated diene content can be obtained by using a generally known halogen addition method. An example of measurement by a normal halogen addition method involves dissolving the sample in a solvent in which it can be completely dissolved, thereafter adding an excessive amount of an iodine monochloride/carbon tetrachloride solution and allowing the reaction to fully occur, then titrating the unreacted iodine monochloride with a sodium thiosulfate/ethanol solution. There are methods of computing the contained amount of conjugated dienes from the amount of double bonds obtained by the aforementioned method and the like.

(2) The vinyl aromatic hydrocarbon block percentage relative to the total amount of the vinyl aromatic hydrocarbons constituting the block copolymer composition is at least 80% and at most 100%, preferably at least 82% and at most 100%. By setting the vinyl aromatic hydrocarbon polymer block percentage to be within the above-mentioned range, the rigidity of the film can be maintained, while also allowing a lamellar microphase separation structure parallel to the MD (longitudinal direction) to be obtained when a heat-shrink film is formed, and keeping size changes in the longitudinal direction small in the temperature range used at the time of shrink attachment. When the vinyl aromatic hydrocarbon polymer block percentage is lower than 80%, the glass transition temperature tends to become lower, and the rigidity and natural-shrinkage resistance tend to become lower when a heat-shrink film is formed.

The "vinyl aromatic hydrocarbon block percentage" refers to the percentage of blocks in which five or more vinyl aromatic hydrocarbons are consecutively bonded, and can be determined by the following Expression (I):

$$\text{Block percentage (\%)} = (W/W0) \times 100 \quad \text{(I)}$$

In Expression (I), W represents the amount of vinyl aromatic hydrocarbons in a state in which five or more vinyl aromatic hydrocarbons are consecutively bonded, and W0

(W zero) represents the total amount of vinyl aromatic hydrocarbons. W and W0 can be measured by means of nuclear magnetic resonance (NMR).

For example, the vinyl aromatic hydrocarbon block percentage relative to the total amount of vinyl aromatic hydrocarbons constituting the block copolymer composition can be computed, using the above-mentioned Expression (I), from the integral value ratio (W) of the peaks of the protons in the aromatic rings in the vinyl aromatic hydrocarbons in the block moieties to the total peak integral value (W0) of the protons in the aromatic rings in the vinyl aromatic hydrocarbons in spectra obtained from $^1$H (proton) NMR measurements performed by using a nuclear magnetic resonance (NMR) spectrometer after dissolving the block copolymer composition in a deuterated solvent in which it can be completely dissolved. For example, in the case of a block copolymer comprising styrene and butadiene, the amount of the aromatic ring proton peaks in the vinyl aromatic hydrocarbons in the block moieties can be considered to be 6-7 ppm.

The vinyl aromatic hydrocarbon block percentage can be controlled by the amount of the vinyl aromatic hydrocarbons that are added alone, the respective added amounts of the vinyl aromatic hydrocarbons and the conjugated dienes as well as the added amount of the randomizer when the vinyl aromatic hydrocarbons and the conjugated dienes are added simultaneously, the supply rates of the vinyl aromatic hydrocarbons and the conjugated dienes when the vinyl aromatic hydrocarbons and the conjugated dienes are added at fixed rates, and the like.

(3) The block copolymer composition contains at least 30 mass % and at most 60 mass %, more preferably at least 30 mass % and at most 50 mass %, of block copolymer components having a conjugated diene content of at least 30 mass %.

By setting the contained amount of block copolymer components in which the conjugated diene content is at least 30 mass % to be within the above-mentioned ranges, the rigidity of the film can be maintained, and also, a lamellar microphase separation structure parallel to the MD (longitudinal direction) can be formed when a heat-shrink film is formed, thereby allowing the size change in the longitudinal direction to be made small in the temperature range used at the time of shrink attachment. If the contained amount of the block copolymer components in which the conjugated diene content is at least 30 mass % is lower than 30 mass %, then a lamellar microphase separation structure parallel to the MD becomes difficult to obtain when a heat-shrink film is formed, in addition to which stretching tends to cause excessive orientation of the block copolymer molecular chains. If the conjugated diene content exceeds 60 mass %, then the rigidity of the film becomes too low and the film becomes difficult to stretch, in addition to which, in the case of shrink packaging by means of the sleeve method, the film tends to bend due to weight, causing attachment defects with respect to the package.

The control of the contained amount of the block copolymer components in which the conjugated diene content is at least 30 mass % can be performed by adjusting the amounts of the conjugated dienes added at each polymerization step, as well as the amount of catalysts added later, the amount of deactivating components such as water, the amount of coupling agents, and the like.

The block copolymer composition can be formed so that at least one type of block copolymer component contains hard blocks mainly comprising vinyl aromatic hydrocarbons and soft blocks mainly comprising conjugated dienes. By containing hard blocks mainly comprising vinyl aromatic hydrocarbons and soft blocks mainly comprising conjugated dienes, a good balance of physical properties such as rigidity, strength, and heat shrinkage performance of the heat-shrink film is achieved, in addition to which a lamellar microphase separation structure parallel to the MD direction becomes easier to obtain. "Mainly comprising" refers to being contained so as to occupy at least 50 mass %, preferably at least 80 mass %, and more preferably at least 90 mass % of said blocks. The "hard blocks mainly comprising the vinyl aromatic hydrocarbon" and the "soft blocks mainly comprising the conjugated diene" can be formed by adjusting the charged amounts of monomers used in the polymerization reactions, as well as by adding arbitrary amounts of the monomers in a single batch. That is, since the rate of consumption is faster for conjugated dienes (e.g., butadiene) than it is for vinyl aromatic hydrocarbons (e.g., styrene), if arbitrary amounts of the vinyl aromatic hydrocarbons and the conjugated dienes are added in a single batch, then initially, the conjugated dienes will mainly react to form soft blocks, and as the polymerization progresses, the proportion of vinyl aromatic hydrocarbons will gradually rise, thereby causing hard blocks to be formed.

The block copolymer composition preferably contains a block copolymer component having a branch chain, examples of the structural formula thereof being the following:

(i) X-B-A;
(ii) X-B-C-A;
(iii) X-A-B-A; and
(iv) X-A-B-C-A.

In formulas (i) to (iv), X represents a coupling agent, A represents a hard block containing at least 94 mass % vinyl aromatic hydrocarbons, B represents a soft block containing at least 80 mass % conjugated dienes, and C represents a copolymer block containing vinyl aromatic hydrocarbons and conjugated dienes, and not satisfying the conditions of one of A and B.

The block copolymer composition preferably contains block copolymer components having a branched structure with both branch chains in which the conjugated diene content is at least 30 mass % and branch chains in which the conjugated diene content is less than 20 mass %. By including branch chains in which the conjugated diene content is at least 30 mass %, it is possible to suppress cases in which the strength of the film using the block copolymer composition is lowered, while also making it easier to obtain a lamellar microphase separation structure that is parallel to the MD when a heat-shrink film is formed, and allowing size changes in the longitudinal direction to be made smaller in the temperature range used at the time of shrink attachment. Additionally, it is possible to prevent the block copolymer molecular chains from being excessively oriented by stretching. By including branch chains in which the conjugated diene content is less than 20 mass %, it is possible to suppress decreases in the rigidity of a film using the block copolymer composition and to stretch the film well, in addition to which, attachment defects with respect to the package are less likely to occur at the time of shrink packaging by means of the sleeve method (a method in which a tubular shrink film is used to cover an attachment target, and thereafter shrink-attached).

Methods for obtaining a block copolymer composition containing block copolymer components having the aforementioned branched structures include a method in which, before the aforementioned branch chains are deactivated, i.e., in a state in which polymerizable terminals still exist, a coupling agent that is to form central moieties in the branched structures is added, and a coupling reaction is induced. In the case of a coupling reaction, block copolymers having linear structures with one or two chains are obtained in a state in which block copolymers having branched structures with three or more chains are also intermixed therein, and further thereto, branched structures are obtained as multiple components in accordance with the types of branch chains used in the coupling reaction. In order to realize the aforementioned characteristics, it is preferable to add a coupling agent to induce a coupling reaction in a state in which branch chains having a conjugated diene content of at least 30 mass % and branch chains having a conjugated diene content less than 20 mass %, both having polymerizable terminals, are intermixed.

The ratio between the components of the block copolymer is mostly determined by the molar ratio of the coupling agent to the number of moles of the branch chains before the coupling reaction. In the case of the block copolymer of the present embodiment, the proportion of the branch chains having at least three chains is preferably the highest. The added amount of the coupling agent for realizing the aforementioned characteristics, for example, in the case in which an epoxidized soybean oil is used as the coupling agent, is preferably 1-1.5 times the equivalent amount (molar ratio), more preferably 1.1-1.4 times the equivalent amount based on all reaction points at which active terminals of the branch chains can react.

In order to realize the balance of various physical properties needed in the heat-shrink film, the preferred molar ratio between the aforementioned branch chains having a conjugated diene content of at least 30 mass % and the branch chains having a conjugated diene content less than 20 mass % before the coupling reaction is preferably (50–90)/(50–10), and more preferably (60–80)/(40–20).

In the case of a block copolymer component having a branched structure, molecular weight components approximating multiple values are obtained for the molecular weight units of each molecular chain. The conjugated diene content in each branch chain can be obtained by means of the aforementioned halogen addition method by fractionating the molecular weight components of the smallest units that are multiples corresponding to single chains within the molecular weight distributions obtained by GPC. Alternatively, the presence of branched structures can be recognized by means of analysis methods combining GPC with a multi-angle light scattering detector (MALS).

(Additives)

The block copolymer composition may contain additives as needed. As types of additives, there are antioxidants (thermal stabilizers), ultraviolet absorbers (anti-weather agents), lubricants, plasticizers, anti-static agents, anti-clouding agents, anti-blocking agents, colorants, and the like, which are commonly used.

As antioxidants, it is possible to use, for example, phenol-based antioxidants such as 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, n-octadecyl-3-(4-hydroxy-3,5-di-tert-butylphenyl) propionate, phosphorus-based antioxidants such as 2,2'-methylene-bis(4,6-di-tert-butylphenyl)octyl phosphite and tris(2,4-di-tert-butylphenyl) phosphite, and the like.

Examples of ultraviolet absorbers include, for example, benzotriazole-based ultraviolet absorbers such as 2-(2-hydroxy-3-tert-butyl-5-methylphenyl)-5-chlorobenzotriazole, triazine-based ultraviolet absorbers such as 2-(4,6-diphenyl-1,3,5-triazin-2-yl)-5-[2-(2-ethylhexanoyloxy)ethoxy]phenol, and hindered-amine anti-weather agents such as tetracis (2,2,6,6-tetramethyl-4-piperidyl)-1,2,3,4-butane tetracarboxylate. Furthermore, it is also possible to add a white oil, a silicone oil, and the like.

Lubricants include fatty acids, fatty acid esters, fatty acid amides, glycerin fatty acid esters (glycerides), sorbitan fatty acid esters, pentaerythritol fatty acid esters, sucrose fatty acid esters, propylene glycol fatty acid esters, and the like, as well as polyolefin waxes such as polyethylene wax and polypropylene, paraffin wax, microcrystalline wax, petrolatum, and the like.

As plasticizers, liquid paraffin is commonly used, and aside therefrom, it is also possible to use organic acid esters such as adipic acid esters, and the like.

As anti-static agents, surfactants such as non-ionic surfactants, anionic surfactants, cationic surfactants, zwitterionic surfactants, and the like are mainly used. The anti-static agent may be used by being kneaded into the resin in advance, or may be used as a surface coating after having molded various types of molded articles.

As anti-clouding agents, it is possible to use the aforementioned glycerides as well as sorbitan fatty acid esters, sucrose fatty acid esters, surfactants, and the like. The anti-clouding agent may be used by being mixed into the resin in advance, or may be used as a surface coating after having molded various types of molded articles.

As colorants, it is possible to use, for example, dyes such as anthraquinone-based compounds for the purpose of adjusting the yellowness, as well as to use organic or inorganic pigments such as titanium oxide, talc, carbon black, and the like for the purpose of imparting light screening properties.

The added amount of the above-mentioned additives is preferably, in terms of the total amount thereof, within the range 0.01-10 mass % relative to the block copolymer composition. By setting the additive content to be within the range 0.01-10 mass %, a good balance of various physical properties such as antioxidant performance, weather resistance, and lubricity can be obtained, while also suppressing decreases in the transparency, the heat shrinkage properties, the strength, and the like of the heat-shrink film. The contained amount of the additive is more preferably 0.05-5 mass %, and even more preferably 0.1-3 mass %.

Anti-blocking agents include organic filler materials such as high-impact polystyrene (HIPS), crosslinked beads of vinyl aromatic hydrocarbons-(meth)acrylic acid esters and/or (meth)acrylic acid copolymers, and crosslinked beads of vinyl aromatic hydrocarbon copolymers, as well as silica beads, quartz beads, and the like. In order to obtain good transparency, it is preferable to use HIPS, crosslinked beads of vinyl aromatic hydrocarbons-(meth)acrylic acid esters and/or (meth)acrylic acid copolymers, and crosslinked beads of vinyl aromatic hydrocarbon copolymers. The anti-blocking agent content should preferably be 0.01-10 mass %, more preferably 0.1-5 mass % relative to 100 mass % of the block copolymer composition.

(Other Resins)

In the block copolymer composition, the aforementioned block copolymer composition is preferably used alone or as the main component. However, it is possible to use at least one type of polymer selected from among the vinyl aromatic hydrocarbon polymers (a) to (d) below, as needed, within a range not compromising the physical properties in practice, by mixing in up to a maximum of 50 mass %, more preferably up to 30 mass %. If the amount exceeds 50 mass %, then the physical properties such as the transparency, the strength and the heat shrinkage properties tend to be reduced.

(a) Vinyl aromatic hydrocarbon polymers.
(b) Copolymers comprising vinyl aromatic hydrocarbons and (meth)acrylic acid esters.
(c) Vinyl aromatic hydrocarbon-conjugated diene-(meth) acrylic acid ester copolymers.
(d) Hydrogenated block copolymers comprising vinyl aromatic hydrocarbons and conjugated dienes.

The (a) vinyl aromatic hydrocarbon polymers include polystyrenes, poly-α-methylstyrenes, syndiotactic polystyrenes, and the like, among which polystyrenes such as general-purpose polystyrene (GPPS) can be favorably used.

The (meth)acrylic acid esters used in the copolymers in (b) and (c) include methyl acrylate, ethyl acrylate, n-propyl acrylate, n-butyl acrylate, isobutyl acrylate, tert-butyl acrylate, isoamyl acrylate, n-hexyl acrylate, (2-ethyl)hexyl acrylate, methyl methacrylate, ethyl methacrylate, n-propyl methacrylate, isopropyl methacrylate, n-butyl methacrylate, isoamyl methacrylate, n-hexyl methacrylate, (2-ethy)hexyl methacrylate, and the like. The vinyl aromatic hydrocarbons include, for example, styrene, o-methylstyrene, p-methylstyrene, p-tert-butylstyrene, 2,4-dimethylstyrene, 2,5-dimethylstyrene, α-methylstyrene, vinylnaphthalene, vinylanthracene, and the like, among which styrene is preferred. The conjugated dienes include, for example, 1,3-butadiene, 2-methyl-1,3-butadiene (isoprene), 2,3-dimethyl-1,3-butadiene, 1,3-pentadiene, 1,3-hexadiene, and the like, among which 1,3-butadiene and/or isoprene are preferred, and 1,3-butadiene (butadiene) is more preferred.

The (d) hydrogenated block copolymers comprising vinyl aromatic hydrocarbons and conjugated dienes include hydrogenated block copolymers including hard blocks mainly comprising vinyl aromatic hydrocarbons and soft blocks mainly comprising conjugated dienes, and the aforementioned block copolymers are obtained by polymerization methods based on generally known methods, and are hydrogenated in the presence of a catalyst. As catalysts, for example, nickel, ruthenium, palladium, and platinum-based catalysts are generally used, and in addition thereto, it is possible to use titanocene compounds, reducible organic metal compounds, or the like.

In the block copolymer composition, it is possible to add other resin components aside from the aforementioned vinyl aromatic hydrocarbon-based polymers within a range not compromising, in practice, the various physical properties necessary for the heat-shrink film characterizing the present invention. Examples of other resins include polyolefins (PO), polyethylene terephthalates (PET), polybutylene terephthalates (PBT), polycarbonates (PC), polyamides (PA), polyvinyl chlorides (PVC), polyacetals (POM), polyvinyl alcohols (PVA), ethylene-vinyl alcohol copolymers (EVOH), and the like, which may be contained within a range not exceeding 30 mass %.

[Heat-Shrink Film]

The heat-shrink film according to the present embodiment is a film formed by using the above-mentioned block copolymer composition. The heat-shrink film can be produced by using a generally known extruder capable of fully plasticizing resins to plasticize the aforementioned block copolymer composition, and thereafter further extruding the block copolymer composition by means of a generally known T-die method or the like to form a sheet or a film, then uniaxially or multi-axially stretching the sheet or film. An example of the most common film production methods is to preheat a sheet or a film extruded by the aforementioned T-die method by bringing the sheet or film into contact with a temperature-controlled roller, making use of differences in roller pulling rates to stretch the film by a factor of approximately 1.0-2.0 in the manufacturing direction, and thereafter tenter-stretching the film by a factor of approximately 2.0-10 in the direction (abbreviated to TD) orthogonal to the MD. In the case of a film obtained by the aforementioned film production method, the direction mainly contributing to heat shrinkage is the TD (corresponding to the aforementioned transverse direction) of the film, and the direction orthogonal to the transverse direction is the longitudinal direction.

When preparing a heat-shrink film, there are no particular restrictions in terms of the specifications of dies that are commonly used in T-die methods as long as the specifications make it difficult for the flow of the resin to be stopped and cause jamming. However, it is preferable to use a coat-hanger-type T-die. The material of the flow channel surface of the T-die is not limited as long as it is a material that has good resin release properties and does not tend to cause stoppages and jamming. As a common material, hard chromium plating may be used.

When preparing the heat-shrink film, the film may be stretched in the TD, as needed, before being stretched in the MD, while keeping size changes in the MD smaller. The preferable range of the stretch factor in the MD is preferably a factor of 1.0-1.4, and more preferably a factor of 1.0-1.3. By setting the stretch factor to be 1.4 or less, the size change rate in the longitudinal direction at 70-100° C. can easily be adjusted within ±2%.

As one of the important physical properties of the heat-shrink film, elasticity is required in the MD in order to withstand tension and the like when transporting the film. The elasticity in the MD is preferably at least 300%, and more preferably at least 400%. By setting the elasticity in the MD to at least 300%, the film can be made unlikely to tear when being processed.

The heat-shrink film is annealed at lower than 100° C. during each stretching step as needed, then the film ends are removed, and thereafter, the film is wound up. Although the winding tension is not particularly restricted, the tension should preferably be controlled to an appropriate tension such as to avoid misaligned winding of the film due to the winding tension being too low, strain caused by film winding tightness due to the winding tension being too high, and the like.

The thickness of the heat-shrink film is not particularly limited. For example, in a shrink label used for plastic bottle packaging applications, by using a multilayer film including, for example, a layer of high-rigidity material, in the case in which common printing equipment, printing methods, attachment methods, and the like are considered, even a film having a thickness of 40 µm may be used, and depending on the method of using the heat-shrink film, further thinning is possible.

If the thickness of the film is uneven, then there is a risk of the appearance of the film being degraded by bumps, flares, and the like in the film roll. Thus, the thickness variation in the TD should preferably be held to within the range ±10% of the average thickness value, and more preferably within the range ±5% of the average thickness value. As means for making the film thickness even, the thickness of the pre-stretched film should be made even by means of control, such as the use of an automated die at the time of extrusion, the film temperature should be made even at the time of stretching, and the like.

In the heat-shrink film, the block copolymer composition of the present embodiment may of course be used as a single layer, and may also be used as at least one or more of multiple layers, as long as the size change in the longitudinal direction in the temperature range 70-100° C. is kept small, which is a characteristic of the present invention, and as long as the other physical properties are also within practically usable ranges.

The heat-shrink film is formed by using the above-mentioned block copolymer composition, and thus the size change in the MD in the 70-100° C. range can be kept within the range ±2%. As a result thereof, wrinkles do not tend to form at the time of shrink attachment to a package, and the appearance and decorative properties of the product are maintained.

The heat-shrink film is formed by using the above-mentioned block copolymer composition. Thus, whitening does not tend to occur due to chemical attacks by organic solvents at the time of printing, and the solvent resistance is increased in comparison with conventional films. As the diluting solvent for ink used in a heat-shrink film formed by using a block copolymer composition containing a vinyl aromatic hydrocarbon and a conjugated diene, a mixture of an alcohol-based solvent such as 2-propanol and an ester-based solvent such as ethyl acetate or propyl acetate is generally used. The higher the resistance to these diluting solvents for ink, the more preferable because the whitening of the film surface due to chemical attacks is suppressed and elasticity reductions tend not to occur. Generally, the higher the proportion of ester-based solvents within a diluting solvent, the stronger the chemical attack tends to be. Taking the case of a solution that is a mixture of 2-propanol and ethyl acetate as an example, the maximum concentration of ethyl acetate at which the film surface does not whiten when the mixed solution is dripped onto the film is preferably at least 35 vol %, and more preferably at least 40 vol %.

The heat-shrink film according to the present embodiment may have a transparency such that the film haze is less than 10%. As a result thereof, the whitening of the film can be prevented from becoming conspicuous, thereby maintaining the decorative properties of the shrink label.

(Utility)

The heat-shrink film using the block copolymer composition of the present invention, which satisfies the aforementioned characteristics, can be used in various forms of packaging, such as heat-shrink labels, heat-shrink cap seals, overpack film, and the like. Additionally, the heat-shrink film can tightly contact, without wrinkles, various package shapes, such as beverage bottles, food products, food product containers, cosmetic products, daily-use products, and the like, and can provide a product with excellent decorative properties by using a heat-shrink film that has been printed.

[Package]

The package according to the present embodiment is a package to which the above-described heat-shrink film has been attached. The package is not particularly limited, and may, for example be a beverage bottle, a food product, a food product container, a cosmetic product, a daily-use product, or the like. The methods for attachment during shrink packaging include steam methods in which steam is applied to the film, thereby heat-shrinking the film so as to tightly contact the package, as well as a dry heating method in which hot air is applied to the film, thereby heat-shrinking the film so as to tightly contact the package, and the like.

In all embodiments, the temperature of the film changes from when the film begins to be heated until the attachment is completed, and for example, in the case of the steam method, the heat shrinkage behavior throughout the 70-100° C. range contributes to the attachment properties. In the above-mentioned heat-shrink film, the size change in the MD in the 70-100° C. range can be kept within the range ±2%. Thus, even in the case in which the steam method is used for attachment, wrinkles tend not to form, and the appearance and decorative properties of the product can be maintained.

EXAMPLES

Hereinafter, the present invention will be explained in detail on the basis of examples. However, the present invention is not limited by these examples.

The production methods of block copolymers (A) to (S) of Reference Examples 1 to 19 will be indicated below.

[Reference Example 1] Production Method of Block Copolymer (A)

(1) A reaction vessel was charged with 467 kg of cyclohexane and 70.1 g of tetrahydrofuran.
(2) While stirring at an internal temperature of 30° C., 1540 mL of n-butyllithium (10 mass % cyclohexane solution) was added, after which, 68.0 kg of styrene monomers were added, and after the internal temperature reached 50° C., the solution was stirred continuously for 30 minutes and allowed to undergo polymerization.
(3) While stirring at an internal temperature of 50° C., 24.0 kg of butadiene monomers were added, and thereafter, the solution was stirred continuously for 10 minutes and allowed to undergo polymerization.
(4) While stirring at an internal temperature of 48° C., 102.0 kg of styrene monomers and 6.0 kg of butadiene monomers were added simultaneously in a single batch, after which the temperature was raised to allow polymerization, and the polymerization was completed.

[Reference Example 2] Production Method of Block Copolymer (B)

(1) A reaction vessel was charged with 490 kg of cyclohexane and 73.5 g of tetrahydrofuran.
(2) While stirring at an internal temperature of 30° C., 960 mL of n-butyllithium (10 mass % cyclohexane solution) was added, after which, 105.0 kg of styrene monomers were added, and after the internal temperature reached 50° C., the solution was stirred continuously for 30 minutes and allowed to undergo polymerization.
(3) While stirring at an internal temperature of 55° C., 1260 mL of n-butyllithium (10 mass % cyclohexane solution) was added, after which, 23.1 kg of styrene monomers were added, and the solution was stirred continuously for 10 minutes and allowed to undergo polymerization.
(4) While stirring at an internal temperature of 45° C., 48.3 kg of styrene monomers and 33.6 kg of butadiene monomers were added simultaneously in a single batch, the solution was stirred continuously for 10 minutes, and the polymerization was completed.

[Reference Example 3] Production Method of Block Copolymer (C)

(1) A reaction vessel was charged with 500 kg of cyclohexane and 75 g of tetrahydrofuran.
(2) While stirring at an internal temperature of 30° C., 1260 mL of n-butyllithium (10 mass % cyclohexane solution) was added, after which, 8.0 kg of styrene monomers were added, and after the internal temperature reached 50° C., the solution was stirred continuously for 30 minutes and allowed to undergo polymerization.
(3) While keeping the internal temperature at 80° C. and stirring, a total of 110.0 kg of styrene monomers and a total of 13.4 kg of butadiene monomers were both simultaneously added at fixed addition rates, respectively, of 87.8 kg/h and 10.7 kg/h, and even after the addition was finished, the state was maintained for 10 minutes.
(4) While stirring at an internal temperature of 75° C., 18.6 kg of butadiene monomers were added, and the solution was stirred continuously for 10 minutes and allowed to undergo polymerization.
(5) While stirring at an internal temperature of 75° C., 50.0 kg of styrene monomers were added, the solution was stirred continuously for 10 minutes, and the polymerization was completed.

[Reference Example 4] Production Method of Block Copolymer (D)

(1) A reaction vessel was charged with 490 kg of cyclohexane and 73.5 g of tetrahydrofuran.
(2) While stirring at an internal temperature of 30° C., 1650 mL of n-butyllithium (10 mass % cyclohexane solution) was added, after which, 35.7 kg of styrene monomers were added, and after the internal temperature reached 50° C., the solution was stirred continuously for 30 minutes and allowed to undergo polymerization.
(3) While stirring at an internal temperature of 40° C., 69.3 kg of styrene monomers and 8.9 kg of butadiene monomers were added simultaneously in a single batch, and the solution was stirred continuously for 10 minutes and allowed to undergo polymerization.
(4) While stirring at an internal temperature of 60° C., 5.5 g of water was added and the reaction was allowed to fully progress, after which, 69.3 kg of styrene monomers and 26.8 kg of butadiene monomers were added simultaneously in a single batch, the solution was stirred continuously for 10 minutes, and the polymerization was completed.

[Reference Example 5] Production Method of Block Copolymer (E)

(1) A reaction vessel was charged with 514 kg of cyclohexane and 77.1 g of tetrahydrofuran.
(2) While stirring at an internal temperature of 30° C., 2910 mL of n-butyllithium (10 mass % cyclohexane solution) was added, after which, 94.4 kg of styrene monomers were added, and after the internal temperature reached 50° C., the solution was stirred continuously for 30 minutes and allowed to undergo polymerization.
(3) While keeping the internal temperature at 80° C. and stirring, a total of 94.2 kg of styrene monomers and a total of 7.3 kg of butadiene monomers were both simultaneously added at fixed addition rates, respectively, of 129.0 kg/h and 10.0 kg/h, and even after the addition was finished, the state was maintained for 10 minutes.
(4) While stirring at an internal temperature of 75° C., 33.0 kg of butadiene monomers were added and allowed to undergo polymerization.
(5) While stirring at an internal temperature of 85° C., 7.1 kg of styrene monomers were added and allowed to undergo polymerization.
(6) While stirring at an internal temperature of 85° C., a total of 302 g of epoxidized soybean oil (Adekacizer O-130P, manufactured by Adeka Corp.) was added, after which the state was maintained for 10 minutes at 70° C., and the polymerization was completed.

[Reference Example 6] Production Method of Block Copolymer (F)

(1) A reaction vessel was charged with 373 kg of cyclohexane and 56.0 g of tetrahydrofuran.
(2) While stirring at an internal temperature of 30° C., 1000 mL of n-butyllithium (10 mass % cyclohexane solution) was added, after which, 8.0 kg of styrene monomers were added, and after the internal temperature reached 50° C., the solution was stirred continuously for 30 minutes and allowed to undergo polymerization.
(3) While stirring at an internal temperature of 65° C., 3.2 kg of butadiene monomers were added, and the solution was stirred continuously for 10 minutes and allowed to undergo polymerization.
(4) While stirring at an internal temperature of 40° C., 46.2 kg of styrene monomers and 25.6 kg of butadiene monomers were added simultaneously in a single batch, after which, the solution was stirred continuously for 10 minutes and allowed to undergo polymerization.
(5) While stirring at an internal temperature of 50° C., 77.0 kg of styrene monomers were added, the solution was stirred continuously for 10 minutes, and the polymerization was completed.

[Reference Example 7] Production Method of Block Copolymer (G)

(1) A reaction vessel was charged with 500 kg of cyclohexane and 75 g of tetrahydrofuran.
(2) While stirring at an internal temperature of 30° C., 2020 mL of n-butyllithium (10 mass % cyclohexane solution) was added, after which, 80.0 kg of styrene monomers were added, and after the internal temperature reached 50° C., the solution was stirred continuously for 30 minutes and allowed to undergo polymerization.
(3) While keeping the internal temperature at 80° C. and stirring, a total of 75.6 kg of styrene monomers and a total of 10.4 kg of butadiene monomers were both simultaneously added at fixed addition rates, respectively, of 75.6 kg/h and 10.4 kg/h, and even after the addition was finished, the state was maintained for 10 minutes.
(4) While stirring at an internal temperature of 75° C., 28.0 kg of butadiene monomers were added, and the solution was stirred continuously for 10 minutes and allowed to undergo polymerization.
(5) While stirring at an internal temperature of 85° C., 6.0 kg of styrene monomers were added, and the solution was stirred continuously for 10 minutes and allowed to undergo polymerization.
(6) While stirring at an internal temperature of 85° C., a total of 428 g of epoxidized soybean oil (Adekacizer O-130P, manufactured by Adeka Corp.) was added, after which, the state was maintained for 10 minutes at 70° C., and the polymerization was completed.

[Reference Example 8] Production Method of Block Copolymer (H)

(1) A reaction vessel was charged with 500 kg of cyclohexane and 75 g of tetrahydrofuran.
(2) While stirring at an internal temperature of 30° C., 1480 mL of n-butyllithium (10 mass % cyclohexane solution) was added, after which, 8.0 kg of styrene monomers were added, and after the internal temperature reached 50° C., the solution was stirred continuously for 30 minutes and allowed to undergo polymerization.
(3) While stirring at an internal temperature of 80° C., a total of 106.0 kg of styrene monomers and a total of 17.4 kg of butadiene monomers were both simultaneously added at fixed addition rates, respectively, of 159.0 kg/h and 26.1 kg/h, and even after the addition was finished, the state was maintained for 10 minutes.
(4) While stirring at an internal temperature of 65° C., 18.0 kg of styrene monomers and 20.6 kg of butadiene monomers were added simultaneously in a single batch, after which, the solution was stirred continuously for 10 minutes and allowed to undergo polymerization.
(5) While stirring at an internal temperature of 70° C., 30.0 kg of styrene monomers were added, the solution was stirred continuously for 10 minutes, and the polymerization was completed.

[Reference Example 9] Production Method of Block Copolymer (I)

(1) A reaction vessel was charged with 500 kg of cyclohexane and 75 g of tetrahydrofuran.
(2) While stirring at an internal temperature of 30° C., 2040 mL of n-butyllithium (10 mass % cyclohexane solution) was added, after which, 80.0 kg of styrene monomers were added, and after the internal temperature reached 50° C., the solution was stirred continuously for 30 minutes and allowed to undergo polymerization.
(3) While keeping the internal temperature at 80° C. and stirring, a total of 71.4 kg of styrene monomers and a total of 14.6 kg of butadiene monomers were both simultaneously added at fixed addition rates, respectively, of 58.7 kg/h and 12.0 kg/h, and even after the addition was finished, the state was maintained for 10 minutes.
(4) While stirring at an internal temperature of 75° C., 28.0 kg of butadiene monomers were added, and the solution was stirred continuously for 10 minutes and allowed to undergo polymerization.
(5) While stirring at an internal temperature of 85° C., 6.0 kg of styrene monomers were added, and the solution was stirred continuously for 10 minutes and allowed to undergo polymerization.
(6) While stirring at an internal temperature of 85° C., a total of 866 g of epoxidized soybean oil (Adekacizer O-130P, manufactured by Adeka Corp.) was added, after which, the state was maintained for 10 minutes at 70° C., and the polymerization was completed.

[Reference Example 10] Production Method of Block Copolymer (J)

(1) A reaction vessel was charged with 500 kg of cyclohexane and 75 g of tetrahydrofuran.
(2) While stirring at an internal temperature of 30° C., 1500 mL of n-butyllithium (10 mass % cyclohexane solution) was added, after which, 8.0 kg of styrene monomers were added, and after the internal temperature reached 50° C., the solution was stirred continuously for 30 minutes and allowed to undergo polymerization.
(3) While keeping the internal temperature at 80° C. and stirring, a total of 123.2 kg of styrene monomers and a total of 20.2 kg of butadiene monomers were both simultaneously added at fixed addition rates, respectively, of 184.8 kg/h and 30.3 kg/h, and even after the addition was finished, the state was maintained for 10 minutes.
(4) While stirring at an internal temperature of 65° C., 14.8 kg of styrene monomers and 23.8 kg of butadiene monomers were added simultaneously in a single batch, after which, the solution was stirred continuously for 10 minutes and allowed to undergo polymerization.
(5) While stirring at an internal temperature of 75° C., 10.0 kg of styrene monomers were added, the solution was stirred continuously for 10 minutes, and the polymerization was completed.

[Reference Example 11] Production Method of Block Copolymer (K)

(1) A reaction vessel was charged with 500 kg of cyclohexane and 75 g of tetrahydrofuran.
(2) While stirring at an internal temperature of 30° C., 1320 mL of n-butyllithium (10 mass % cyclohexane solution) was added, after which, 15.6 kg of styrene monomers were added, and after the internal temperature reached 50° C., the solution was stirred continuously for 30 minutes and allowed to undergo polymerization.
(3) While stirring at an internal temperature of 50° C., 65.2 kg of styrene monomers and 48.0 kg of butadiene monomers were added simultaneously in a single batch and allowed to undergo polymerization.
(4) While stirring at an internal temperature of 60° C., 9.0 g of water was added and the reaction was allowed to fully progress, after which, 71.2 kg of styrene monomers were added, and the polymerization was completed.

[Reference Example 12] Production Method of Block Copolymer (L)

(1) A reaction vessel was charged with 500 kg of cyclohexane and 75 g of tetrahydrofuran.
(2) While stirring at an internal temperature of 30° C., 1750 mL of n-butyllithium (10 mass % cyclohexane solution) was added, after which, 4.0 kg of styrene monomers were added, and after the internal temperature reached 50° C., the solution was stirred continuously for 30 minutes, and the temperature was raised to allow polymerization.
(3) While keeping the internal temperature at 80° C. and stirring, a total of 119.0 kg of styrene monomers and a total of 11.8 kg of butadiene monomers were both simultaneously added at fixed addition rates, respectively, of 100.8 kg/h and 10.0 kg/h, and even after the addition was finished, the state was maintained for 10 minutes.
(4) While stirring at an internal temperature of 70° C., 36.4 kg of butadiene monomers were added, and the solution was stirred continuously for 10 minutes and allowed to undergo polymerization.

(5) While stirring at an internal temperature of 70° C., 28.8 kg of styrene monomers were added, the solution was stirred continuously for 10 minutes, and the polymerization was completed.

[Reference Example 13] Production Method of Block Copolymer (M)

(1) A reaction vessel was charged with 467 kg of cyclohexane and 70.1 g of tetrahydrofuran.
(2) While stirring at an internal temperature of 30° C., 1260 mL of n-butyllithium (10 mass % cyclohexane solution) was added, after which, 82.2 kg of styrene monomers were added, and after the internal temperature reached 50° C., the solution was stirred continuously for 30 minutes, and the temperature was raised to allow polymerization.
(3) While keeping the internal temperature at 45° C. and stirring, 4170 mL of n-butyllithium (10 mass % cyclohexane solution) was added, 69.8 kg of styrene monomers were added, and the solution was stirred continuously for 10 minutes and allowed to undergo polymerization.
(4) While stirring at an internal temperature of 50° C., 48.0 kg of butadiene monomers were added, and the solution was stirred continuously for 10 minutes and allowed to undergo polymerization.
(5) While stirring at an internal temperature of 75° C., a total of 600 g of epoxidized soybean oil (Adekacizer O-130P, manufactured by Adeka Corp.) was added, after which, the state was maintained for 10 minutes at 75° C., and the polymerization was completed.

[Reference Example 14] Production Method of Block Copolymer (N)

(1) A reaction vessel was charged with 467 kg of cyclohexane and 70.1 g of tetrahydrofuran.
(2) While stirring at an internal temperature of 30° C., 1440 mL of n-butyllithium (10 mass % cyclohexane solution) was added, after which, 93.8 kg of styrene monomers were added, and after the internal temperature reached 50° C., the solution was stirred continuously for 30 minutes and allowed to undergo polymerization.
(3) While keeping the internal temperature at 55° C. and stirring, 3450 mL of n-butyllithium (10 mass % cyclohexane solution) was added, 58.2 kg of styrene monomers were added, and the solution was stirred continuously for 10 minutes and allowed to undergo polymerization.
(4) While stirring at an internal temperature of 55° C., 48.0 kg of butadiene monomers were added, and the solution was stirred continuously for 10 minutes and allowed to undergo polymerization.
(5) While stirring at an internal temperature of 75° C., a total of 554 g of epoxidized soybean oil (Adekacizer O-130P, manufactured by Adeka Corp.) was added, after which, the solution was stirred for 10 minutes at 75° C., and the polymerization was completed.

[Reference Example 15] Production Method of Block Copolymer (O)

(1) A reaction vessel was charged with 467 kg of cyclohexane and 70.1 g of tetrahydrofuran.
(2) While stirring at an internal temperature of 30° C., 1440 mL of n-butyllithium (10 mass % cyclohexane solution) was added, after which, 93.8 kg of styrene monomers were added, and after the internal temperature reached 50° C., the solution was stirred continuously for 30 minutes and allowed to undergo polymerization.
(3) While keeping the internal temperature at 55° C. and stirring, 3450 mL of n-butyllithium (10 mass % cyclohexane solution) was added, 52.2 kg of styrene monomers were added, and the solution was stirred continuously for 10 minutes and allowed to undergo polymerization.
(4) While stirring at an internal temperature of 55° C., 48.0 kg of butadiene monomers were added, and the solution was stirred continuously for 10 minutes and allowed to undergo polymerization.
(5) While stirring at an internal temperature of 65° C., 6.0 kg of styrene monomers were added, and the solution was stirred continuously for 10 minutes and allowed to undergo polymerization.
(6) While stirring at an internal temperature of 75° C., a total of 554 g of epoxidized soybean oil (Adekacizer O-130P, manufactured by Adeka Corp.) was added, after which, the solution was stirred for 10 minutes at 75° C., and the polymerization was completed.

[Reference Example 16] Production Method of Block Copolymer (P)

(1) A reaction vessel was charged with 467 kg of cyclohexane and 70.1 g of tetrahydrofuran.
(2) While stirring at an internal temperature of 30° C., 1390 mL of n-butyllithium (10 mass % cyclohexane solution) was added, after which, 93.8 kg of styrene monomers were added, and after the internal temperature reached 50° C., the solution was stirred continuously for 30 minutes and the temperature was raised to allow polymerization.
(3) While stirring at an internal temperature at 45° C., 3700 mL of n-butyllithium (10 mass % cyclohexane solution) was added, 48.2 kg of styrene monomers were added, and the solution was stirred continuously for 10 minutes and allowed to undergo polymerization.
(4) While stirring at an internal temperature of 80° C., a total of 8.0 kg of styrene monomers and a total of 2.0 kg of butadiene monomers were both simultaneously added at fixed addition rates, respectively, of 96.0 kg/h and 24.0 kg/h, and even after the addition was finished, the state was maintained for 10 minutes.
(5) While stirring at an internal temperature of 50° C., 48.0 kg of butadiene monomers were added, and the solution was stirred continuously for 10 minutes and allowed to undergo polymerization.
(6) While stirring at an internal temperature of 75° C., a total of 559 g of epoxidized soybean oil (Adekacizer O-130P, manufactured by Adeka Corp.) was added, after which, the state was maintained for 10 minutes at 75° C., and the polymerization was completed.

[Reference Example 17] Production Method of Block Copolymer (Q)

(1) A reaction vessel was charged with 467 kg of cyclohexane and 70.1 g of tetrahydrofuran.
(2) While stirring at an internal temperature of 30° C., 1450 mL of n-butyllithium (10 mass % cyclohexane solution) was added.
(3) While keeping the internal temperature at 80° C. and stirring, a total of 89.1 kg of styrene monomers and a total of 4.7 kg of butadiene monomers were both simultaneously added at fixed addition rates, respectively, of 178.2 kg/h and 9.4 kg/h, and even after the addition was finished, the state was maintained for 10 minutes.

(4) While keeping the internal temperature at 80° C. and stirring, 3800 mL of n-butyllithium (10 mass % cyclohexane solution) was added, after which, a total of 40.0 kg of styrene monomers and a total of 2.2 kg of butadiene monomers were both simultaneously added at fixed addition rates, respectively, of 200.0 kg/h and 11.0 kg/h, and even after the addition was finished, the state was maintained for 10 minutes.
(5) While keeping the internal temperature at 80° C. and stirring, a total of 8.0 kg of styrene monomers and a total of 2.0 kg of butadiene monomers were both simultaneously added at fixed addition rates, respectively, of 80.0 kg/h and 20.0 kg/h, and even after the addition was finished, the state was maintained for 10 minutes.
(6) While keeping the internal temperature at 80° C. and stirring, a total of 10.0 kg of styrene monomers and a total of 40.0 kg of butadiene monomers were both simultaneously added at fixed addition rates, respectively, of 25.0 kg/h and 100.0 kg/h, and even after the addition was finished, the state was maintained for 10 minutes.
(7) While keeping the internal temperature at 80° C. and stirring, a total of 3.8 kg of styrene monomers and a total of 0.2 kg of butadiene monomers were both simultaneously added at fixed addition rates, respectively, of 190.0 kg/h and 10.0 kg/h, and even after the addition was finished, the state was maintained for 10 minutes.
(8) While stirring at an internal temperature of 75° C., a total of 570 g of epoxidized soybean oil (Adekacizer O-130P, manufactured by Adeka Corp.) was added, after which, the solution was stirred for 10 minutes at 75° C., and the polymerization was completed.

[Reference Example 18] Production Method of Block Copolymer®

(1) A reaction vessel was charged with 373 kg of cyclohexane and 56.0 g of tetrahydrofuran.
(2) While stirring at an internal temperature of 30° C., 1960 mL of n-butyllithium (10 mass % cyclohexane solution) was added, after which, 16.0 kg of styrene monomers were added, and after the internal temperature reached 50° C., the solution was stirred continuously for 30 minutes and allowed to undergo polymerization.
(3) While stirring at an internal temperature of 65° C., 4.8 kg of butadiene monomers were added, and the solution was stirred continuously for 10 minutes and allowed to undergo polymerization.
(4) While stirring at an internal temperature of 40° C., 89.6 kg of styrene monomers and 49.6 kg of butadiene monomers were added simultaneously in a single batch, the solution was stirred continuously for 10 minutes, and the polymerization was completed.

[Reference Example 19] Production Method of Block Copolymer (S)

(1) A reaction vessel was charged with 376 kg of cyclohexane and 56.4 g of tetrahydrofuran.
(2) While stirring at an internal temperature of 30° C., 2900 mL of n-butyllithium (10 mass % cyclohexane solution) was added, after which, 33.0 kg of styrene monomers were added, and after the internal temperature reached 50° C., the solution was stirred continuously for 30 minutes and allowed to undergo polymerization.
(3) While stirring at an internal temperature of 40° C., 49.5 kg of styrene monomers and 67.5 kg of butadiene monomers were added simultaneously in a single batch, the solution was stirred continuously for 10 minutes, and the polymerization was completed.

The structural characteristics of the block copolymers A to S obtained in this manner are described in tables 1 to 3. The weight-average molecular weights of the block copolymers, the conjugated diene content in the block copolymers, the vinyl aromatic hydrocarbon block percentages within the total amounts of the vinyl aromatic hydrocarbons in the block copolymers, the content of polymer components having a conjugated diene content of at least 30 mass %, and the presence or absence of branched structures were measured in accordance with the methods described below.

TABLE 1

| | | Reference Example 1 | Reference Example 2 | Reference Example 3 | Reference Example 4 |
|---|---|---|---|---|---|
| Block copolymer composition | Block copolymer identification symbol | (A) | (B) | (C) | (D) |
| | Weight-average molecular weight of block copolymer | 156000 | 139000 | 185000 | 172000 |
| | Conjugated diene content (mass %) in block copolymer | 15 | 16 | 16 | 17 |
| | Vinyl aromatic hydrocarbon polymer block percentage (%) relative to total amount of vinyl aromatic hydrocarbons in block copolymer | 91 | 92 | 87 | 83 |
| | Content (mass %) of block copolymer components with conjugated diene content of at least 30 mass % Conjugated diene content (mass %) in parentheses | 0 (—) | 30 (32) | 0 (—) | 0 (—) |
| | Presence/absence of block copolymers having branched structures (—) | absent | absent | absent | absent |
| Branch component 1 | Structure of branch chain | No branched structures | No branched structures | No branched structures | No branched structures |
| | Conjugated diene content (mass %) in branch chain | | | | |
| | Vinyl aromatic hydrocarbon content (mass %) in A | | | | |
| | Type of A in parentheses | | | | |
| | Conjugated diene content (mass %) in B | | | | |

TABLE 1-continued

| | | | | |
|---|---|---|---|---|
| Branch component 2 | Structure of branch chain<br>Conjugated diene content (mass %) in branch chain<br>Vinyl aromatic hydrocarbon content (mass %) in A<br>Type of A in parentheses<br>Conjugated diene content (mass %) in B | | | |

| | | Reference Example 5 | Reference Example 6 | Reference Example 7 |
|---|---|---|---|---|
| Block copolymer composition | Block copolymer identification symbol | (E) | (F) | (G) |
| | Weight-average molecular weight of block copolymer | 220000 | 208000 | 205000 |
| | Conjugated diene content (mass %) in block copolymer | 17 | 18 | 19 |
| | Vinyl aromatic hydrocarbon polymer block percentage (%) relative to total amount of vinyl aromatic hydrocarbons in block copolymer | 86 | 87 | 87 |
| | Content (mass %) of block copolymer components with conjugated diene content of at least 30 mass %<br>Conjugated diene content (mass %) in parentheses | 0 (—) | 0 (—) | 0 (—) |
| | Presence/absence of block copolymers having branched structures (—) | present | absent | present |
| Branch component 1 | Structure of branch chain | X-A1-B-C-A2 | No branched structures | X-A1-B-C-A2 |
| | Conjugated diene content (mass %) in branch chain | 17 | | 19 |
| | Vinyl aromatic hydrocarbon content (mass %) in A | 100 (A1) | | 100 (A1) |
| | Type of A in parentheses | 100 (A2) | | 100 (A2) |
| | Conjugated diene content (mass %) in B | 100 | | 100 |
| Branch component 2 | Structure of branch chain<br>Conjugated diene content (mass %) in branch chain<br>Vinyl aromatic hydrocarbon content (mass %) in A<br>Type of A in parentheses<br>Conjugated diene content (mass %) in B | | | |

TABLE 2

| | | Reference Example 8 | Reference Example 9 | Reference Example 10 | Reference Example 11 |
|---|---|---|---|---|---|
| Block copolymer composition | Block copolymer identification symbol | (H) | (I) | (J) | (K) |
| | Weight-average molecular weight of block copolymer | 164000 | 187000 | 173000 | 235000 |
| | Conjugated diene content (mass %) in block copolymer | 19 | 21 | 22 | 24 |
| | Vinyl aromatic hydrocarbon polymer block percentage (%) relative to total amount of vinyl aromatic hydrocarbons in block copolymer | 86 | 87 | 85 | 85 |
| | Content (mass %) of block copolymer components with conjugated diene content of at least 30 mass %<br>Conjugated diene content (mass %) in parentheses | 0 (—) | 0 (—) | 0 (—) | 42 (37) |
| | Presence/absence of block copolymers having branched structures (—) | absent | present | absent | absent |
| Branch component 1 | Structure of branch chain | No branched structures | X-A1-B-C-A2 | No branched structures | No branched structures |
| | Conjugated diene content (mass %) in branch chain | | 21 | | |
| | Vinyl aromatic hydrocarbon content (mass %) in A | | 100 (A1) | | |
| | Type of A in parentheses | | 100 (A2) | | |
| | Conjugated diene content (mass %) in B | | 100 | | |
| Branch component 2 | Structure of branch chain<br>Conjugated diene content (mass %) in branch chain<br>Vinyl aromatic hydrocarbon content (mass %) in A<br>Type of A in parentheses<br>Conjugated diene content (mass %) in B | | | | |

TABLE 2-continued

|  |  | Reference Example 12 | Reference Example 13 | Reference Example 14 |
|---|---|---|---|---|
| Block copolymer composition | Block copolymer identification symbol | (L) | (M) | (N) |
|  | Weight-average molecular weight of block copolymer | 140000 | 152000 | 160000 |
|  | Conjugated diene content (mass %) in block copolymer | 24 | 24 | 24 |
|  | Vinyl aromatic hydrocarbon polymer block percentage (%) relative to total amount of vinyl aromatic hydrocarbons in block copolymer | 88 | 99 | 99 |
|  | Content (mass %) of block copolymer components with conjugated diene content of at least 30 mass % Conjugated diene content (mass %) in parentheses | 0 (—) | 37 (41) | 34 (45) |
|  | Presence/absence of block copolymers having branched structures (—) | absent | present | present |
| Branch component 1 | Structure of branch chain | No branched structures | X-B-A | X-B-A |
|  | Conjugated diene content (mass %) in branch chain |  | 8 | 9 |
|  | Vinyl aromatic hydrocarbon content (mass %) in A Type of A in parentheses |  | 100 | 100 |
|  | Conjugated diene content (mass %) in B |  | 100 | 100 |
| Branch component 2 | Structure of branch chain |  | X-B-A | X-B-A |
|  | Conjugated diene content (mass %) in branch chain |  | 41 | 45 |
|  | Vinyl aromatic hydrocarbon content (mass %) in A Type of A in parentheses |  | 100 | 100 |
|  | Conjugated diene content (mass %) in B |  | 100 | 100 |

TABLE 3

|  |  | Reference Example 15 | Reference Example 16 | Reference Example 17 | Reference Example 18 | Reference Example 19 |
|---|---|---|---|---|---|---|
| Block copolymer composition | Block copolymer identification symbol | (O) | (P) | (Q) | (R) | S |
|  | Weight-average molecular weight of block copolymer | 155000 | 161000 | 147000 | 112000 | 67000 |
|  | Conjugated diene content (mass %) in block copolymer | 24 | 25 | 25 | 34 | 45 |
|  | Vinyl aromatic hydrocarbon polymer block percentage (%) relative to total amount of vinyl aromatic hydrocarbons in block copolymer | 99 | 95 | 86 | 76 | 79 |
|  | Content (mass %) of block copolymer components with conjugated diene content of at least 30 mass % Conjugated diene content (mass %) in parentheses | 34 (45) | 30 (47) | 31 (42) | 100 (34) | 100 (45) |
|  | Presence/absence of block copolymers having branched structures (—) | present | present | present | absent | absent |
| Branch component 1 | Structure of branch chain | X-A1-B-A2 | X-B-C-A | X-A1-B-C-A2 | No branched structures | No branched structures |
|  | Conjugated diene content (mass %) in branch chain | 9 | 9 | 14 |  |  |
|  | Vinyl aromatic hydrocarbon content (mass %) in A Type of A in parentheses | 100 (A1) 100 (A2) | 100 | 95 (A1) 95 (A2) |  |  |
|  | Conjugated diene content (mass %) in B | 100 | 100 | 80 |  |  |
| Branch component 2 | Structure of branch chain | X-A1-B-A2 | X-B-C-A | X-A1-B-C-A2 |  |  |
|  | Conjugated diene content (mass %) in branch chain | 45 | 47 | 42 |  |  |
|  | Vinyl aromatic hydrocarbon content (mass %) in A Type of A in parentheses | 100 (A1) 100 (A2) | 100 | 95 (A1) 95 (A2) |  |  |
|  | Conjugated diene content (mass %) in B | 100 | 100 | 80 |  |  |

[Measurement of Weight-Average Molecular Weight]

The molecular weights of the block copolymers were measured by the GPC measurement apparatus and under the conditions indicated below.

- Apparatus name: High-speed GPC apparatus HLC-8220 (manufactured by Tosoh Corporation)
- Column: Three serially arranged PL gel MIXED-B columns
- Temperature: 40° C.
- Detection: Differential refractive index
- Solvent: Tetrahydrofuran
- Concentration: 2 wt %
- Calibration curve: Prepared by using standard polystyrenes (manufactured by Polymer Laboratories), and weight-average molecular weights (Mw) computed as polystyrene-converted molecular weights.

[Measurement of Conjugated Diene Content]

The mass % of conjugated dienes in 100 mass % of the block copolymer compositions were measured by the method indicated below.

(1) 0.1 g of a sample was dissolved in 50 mL of chloroform.
(2) 25 mL of an iodine monochloride/carbon tetrachloride solution was added and mixed well, after which, the solution was allowed to rest for one hour in the dark.
(3) 75 mL of a 2.5% potassium iodide solution was added and mixed well.

(4) A 20% sodium thiosulfate/ethanol solution was added while stirring well, until the color of the liquid became a pale yellowish color.

(5) Approximately 0.5 mL of a 1% starch indicator was added, and titration was again performed with a 20% sodium thiosulfate/ethanol solution until the solution became colorless.

(6) After the titration was completed, the consumed amount a [mL] of the sodium thiosulfate/ethanol solution was measured.

In order to make corrections by measuring a blank, the operations in (1) to (6) were also performed for just chloroform, and the consumed amount b [mL] of the sodium thiosulfate/ethanol solution was measured.

The conjugated diene content was computed from the measured values in accordance with the following expression:

$$\text{Conjugated diene content (\%)} = [\{(b-a) \times 0.1 \times c \times 27/100\}/W] \times 100$$

c: Titer of 20% sodium thiosulfate/ethanol solution

W: Sample amount [g]

[Vinyl Aromatic Hydrocarbon Block Percentage in Total Amount of Vinyl Aromatic Hydrocarbons in Block Copolymer Composition]

The vinyl aromatic hydrocarbon block percentages in the total amounts of vinyl aromatic hydrocarbons in the block copolymer compositions were computed from spectral data measured by using the nuclear magnetic resonance (NMR) spectrometer and conditions indicated below. As the computation method, the method described in JP 2014-240461 A was followed. That is, the computations were made by means of expression (I) from the integral value ratio (W) of peaks of protons in the aromatic rings in the vinyl aromatic hydrocarbons in the block moieties with respect to the total peak integral value (W0) of protons in the aromatic rings in the vinyl aromatic hydrocarbons in the spectra obtained by $^1$H (proton) NMR measurements using the nuclear magnetic resonance (NMR) spectrometer.

$$\text{Block percentage (\%)} = (W/W0) \times 100 \quad (I)$$

In Expression (I), W represents the amount of vinyl aromatic hydrocarbons in a state in which five or more vinyl aromatic hydrocarbons are consecutively bonded, and W0 (W zero) represents the total amount of vinyl aromatic hydrocarbons.

(Nuclear Magnetic Resonance (NMR) Spectrometer and Conditions)

Apparatus name: Fourier transform NMR spectrometer JNM-MV25 (manufactured by JEOL Ltd.)

Measurement frequency: 500 MHz

Measurement method: 1H-NMR

Measurement temperature: 23° C.

Solvent: Deuterated chloroform

[Content of Block Copolymer Components with Conjugated Diene Content of 30 Mass % or More]

The contents of block copolymer components with a conjugated diene content of 30 mass % or more among the block copolymer compositions were computed by quantifying the conjugated diene content in polymer components fractionated by the aforementioned GPC by means of the aforementioned measurement method, and using the proportions of the summed values of the GPC intensity ratios in the block copolymer components in which the conjugated diene content was 30 mass % or more relative to the entire block copolymer. In the case in which there are multiple block copolymer components in which the conjugated diene content was 30 mass % or more, the arithmetic mean value of the conjugated diene contents and the respective component contents (GPC area ratio) were indicated as representative values in the tables.

[Presence or Absence of Branched Structures]

Regarding the presence or absence of polymer components having branched structures in the block copolymer compositions, aside from being able to be determined by whether or not coupling agents were used while polymerizable terminals were present during polymerization, they can [also?] be confirmed by the presence or absence of multiple-value molecular weight peaks due to having one to four branch chains from the aforementioned GPC, and the presence thereof can also be determined from approximations of the conjugated diene contents, block percentages, glass transition temperatures and the like in the respective fractionated polymer components.

Examples 1 to 7 and Comparative Examples 1 to 8

As the block copolymer compositions used in Examples 1 to 6, after polymerization in accordance with the above-described reference examples, pellets remaining after removing the solvents were used, unmodified and alone. As the block copolymer composition used for Example 7, after pellets of the respective raw materials obtained in the above-described reference examples were blended (dry-blended) well, they were loaded into a single-screw (screw diameter 40 mm, screw effective length/screw diameter ratio=24, with kneading portion (Dulmage type)) extruder manufactured by Tabata Industrial Machinery Co., Ltd., homogeneously melt-mixed at 200° C., then formed into homogeneous pellets.

As the block copolymer compositions used in Comparative Examples 1 to 8, after polymerization of the respective block copolymers that were to form the constituent components in accordance with the above-described reference examples, the components were blended in the solution state, and the solvents were removed.

The compositions and physical properties of the block copolymer compositions of Examples 1 to 7 were recorded in Table 4, and the compositions and physical properties of Comparative Examples 1 to 8 were recorded in Table 5. The weight-average molecular weights of the block copolymer compositions, the conjugated diene content in the block copolymer compositions, the vinyl aromatic hydrocarbon block percentages in the total amounts of the vinyl aromatic hydrocarbons in the block copolymers, the content of block copolymer components with a conjugated diene content of at least 30 mass %, and the presence or absence of branched structures were measured in accordance with the aforementioned methods.

Next, the block copolymer compositions of Examples 1 to 7 and Comparative Examples 1 to 8 were used to prepare heat-shrink films as indicated below. The block copolymer compositions were extruded in sheet form, while being melted at 200° C., by a single-screw extruder (screw diameter (L) 65 mm, screw length/diameter ratio (L/D ratio)= 35.8, compression ratio 2.85, with kneading portion (Dulmage type)) equipped with a T-die (discharge port width 300 mm, discharge port lip spacing 0.5 mm, coat hanger/downward discharge system), after which the draw ratio was adjusted to obtain sheets having an average thickness of approximately 0.25 mm. The aforementioned sheets, in subsequent downstream processes, were stretched by a factor of 1.1 in the sheet flow direction (hereinafter abbreviated to "MD") due to a roller pulling rate difference while being heated to a temperature appropriate for stretching, and further stretched, by a tenter stretcher, by a factor of 4.5 in the direction (hereinafter abbreviated to "TD") orthogonal to the sheet flow direction while being heated to the stretching temperature, thereby resulting in heat-shrink films having an average thickness of approximately 50 μm. The physical properties of the prepared films were measured in accordance with the methods indicated below, and are described in Tables 4 and 5.

TABLE 4

| | | Example 1 | Example 2 | Example 3 | Example 4 | Example 5 | Example 6 | Example 7 |
|---|---|---|---|---|---|---|---|---|
| Block copolymer composition | Type of block copolymer | (K) | (N) | | | (P) | (Q) | (A)/(B)/(S) |
| | Block copolymer content (mass %) | 100 | 100 | | | 100 | 100 | 53.3/20/26.7 |
| | Weight-average molecular weight of block copolymer | 235000 | 152000 | 160000 | 155000 | 161000 | 147000 | 133000 |
| | Conjugated diene content (mass %) in block copolymer | 24 | 24 | 24 | 24 | 25 | 26 | 23 |
| | Vinyl aromatic hydrocarbon polymer block percentage (%) relative to total amount of vinyl aromatic hydrocarbons in block copolymer | 85 | 99 | 99 | 99 | 95 | 95 | 88 |
| | Content (mass %) of block copolymer components with conjugated diene content of at least 30 mass % Conjugated diene content (mass %) in parentheses | 42 | 37 (41) | 34 (45) | 34 (45) | 30 (47) | 31 (49) | 33 (43) |
| | Presence/absence of block copolymers having branched structures (—) | absent | present | present | present | present | present | absent |
| Physical properties of heat-shrink film using above block copolymer | Film thickness [mm] | 0.051 | 0.052 | 0.049 | 0.051 | 0.050 | 0.053 | 0.051 |
| | MD heat shrinkage rate (%) of film after 10 seconds immersion in 70° C. hot water | −1 | 0 | −1 | −1 | 0 | 0 | −1 |
| | MD heat shrinkage rate (%) of film after 10 seconds immersion in 80° C. hot water | −1 | 0 | 0 | 0 | 0 | −1 | −1 |
| | MD heat shrinkage rate (%) of film after 10 seconds immersion in 90° C. hot water | 0 | −1 | −1 | −1 | 1 | −1 | 1 |
| | MD heat shrinkage rate (%) of film after 10 seconds immersion in 100° C. hot water | 2 | −1 | −1 | −1 | −1 | −1 | 2 |
| | Determination of MD size change resistance performance | good | excellent | excellent | excellent | excellent | excellent | good |
| | TD heat shrinkage rate (%) of film after 10 seconds immersion in 70° C. hot water | 5 | 9 | 10 | 10 | 12 | 17 | 22 |
| | TD heat shrinkage rate (%) of film after 10 seconds immersion in 80° C. hot water | 13 | 23 | 23 | 24 | 26 | 25 | 41 |
| | TD heat shrinkage rate (%) of film after 10 seconds immersion in 90° C. hot water | 33 | 40 | 42 | 41 | 42 | 44 | 59 |
| | TD heat shrinkage rate (%) of film after 10 seconds immersion in 100° C. hot water | 51 | 60 | 60 | 61 | 62 | 63 | 73 |
| | Determination of TD heat shrinkage performance | good | excellent | excellent | excellent | excellent | excellent | excellent |
| | Tensile modulus (MPa) in MD | 800 | 1030 | 1060 | 1060 | 1010 | 1030 | 1030 |
| | Determination of film rigidity | good | excellent | excellent | excellent | excellent | excellent | excellent |
| | Tensile elongation (%) in MD | 420 | 430 | 450 | 430 | 460 | 420 | 450 |
| | Determination of film strength | excellent | excellent | excellent | excellent | excellent | excellent | excellent |
| | Tensile modulus (MPa) in TD | 10 | 850 | 960 | 870 | 900 | 890 | 820 |
| | Tensile elongation (%) in TD | 130 | 70 | 60 | 70 | 90 | 90 | 70 |
| | Total light transmittance (%) | 91 | 91 | 91 | 91 | 90 | 90 | 90 |
| | Haze (%) | 0.2 | 6.5 | 6.7 | 5.8 | 7.2 | 8.0 | 5.9 |
| | Determination of film transparency | good | excellent | excellent | excellent | good | good | excellent |
| | Highest concentration (vol%) of ethyl acetate in 2-propanol/ethyl acetate for which film whitening did not occur when solvent dripped | 50 | 45 | 45 | 45 | 45 | 45 | 40 |
| | Determination of solvent resistance | excellent | excellent | excellent | excellent | excellent | excellent | good |

TABLE 5

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Block copolymer composition | Type of block copolymer | (B)/(D) | (C)/(D)/(L) | (E)/O | | (H)/(J) | (F)/(R) | (S) | (K)/(B)/(D) |
| | Block copolymer content (mass %) | 33/67 | 33/33/34 | 67/33 | 67/33 | 33/67 | 33/67 | 100 | 50/17/33 |
| | Weight-average molecular weight of block copolymer | 171000 | 161000 | 218000 | 203000 | 171000 | 148000 | 67000 | 167000 |
| | Conjugated diene content (mass %) in block copolymer | 17 | 19 | 18 | 20 | 21 | 29 | 45 | 20 |
| | Vinyl aromatic hydrocarbon polymer block percentage (%) relative to total amount of vinyl aromatic hydrocarbons in block copolymer | 86 | 88 | 86 | 87 | 85 | 79 | 79 | 85 |
| | Content (mass %) of block copolymer components with conjugated diene content of at least 30 mass % Conjugated diene content (mass %) in parentheses | 10 (32) | 0 (—) | 0 (—) | 0 (—) | 0 (—) | 67 (34) | 100 (45) | 5 (32) 21 (37) |
| | Presence/absence of block copolymers having branched structures | absent | absent | present | present | absent | absent | absent | absent |
| Physical properties of heat-shrink film using above block copolymer | Film thickness [mm] | 0.052 | 0.049 | 0.048 | 0.050 | 0.051 | 0.048 | Could not be stretched Film sample unobtainable | 0.053 |
| | MD heat shrinkage rate (%) of film after 10 seconds immersion in 70° C. hot water | −1 | −1 | −1 | −1 | −14 | 1 | | −1 |
| | MD heat shrinkage rate (%) of film after 10 seconds immersion in 80° C. hot water | −2 | 0 | 4 | −1 | −3 | 0 | | −4 |
| | MD heat shrinkage rate (%) of film after 10 seconds immersion in 90° C. hot water | 0 | 10 | 11 | 5 | −1 | −2 | | −2 |
| | MD heat shrinkage rate (%) of film after 10 seconds immersion in 100° C. hot water | 10 | 21 | 11 | 13 | 6 | 1 | | −1 |
| | Determination of MD size change resistance performance | poor | ooor | poor | poor | poor | good | | poor |
| | TD heat shrinkage rate (%) of film after 10 seconds immersion in 70° C. hot water | 9 | 14 | 9 | 11 | 54 | 10 | | 10 |
| | TD heat shrinkage rate (%) of film after 10 seconds immersion in 80° C. hot water | 29 | 55 | 42 | 45 | 62 | 21 | | 21 |
| | TD heat shrinkage rate (%) of film after 10 seconds immersion in 90° C. hot water | 57 | 72 | 63 | 69 | 68 | 32 | | 43 |
| | TD heat shrinkage rate (%) of film after 10 seconds immersion in 100° C. hot water | 72 | 77 | 76 | 77 | 75 | 48 | | 60 |
| | Determination of TD heat shrinkage performance | excellent | excellent | excellent | excellent | excellent | poor | | excellent |
| | Tensile modulus (MPa) in MD | 1130 | 1290 | 1260 | 1200 | 1180 | 350 | | 900 |
| | Determination of film rigidity | excellent | excellent | excellent | excellent | excellent | poor | | excellent |
| | Tensile elongation (%) in MD | 370 | 300 | 290 | 310 | 150 | 400 | | 310 |
| | Determination of film strength | good | good | good | good | poor | excellent | | excellent |
| | Tensile modulus (MPa) in TD | 1620 | 1750 | 1720 | 1690 | 1650 | 210 | | 1100 |
| | Tensile elongation (%) in TD | 90 | 60 | 50 | 50 | 130 | 240 | | 110 |
| | Total light transmittance (%) | 90 | 90 | 90 | 90 | 90 | 89 | | 90 |
| | Haze (%) | 4.5 | 4.0 | 4.8 | 5.1 | 4.9 | 10.6 | | 5 |
| | Determination of film transparency | excellent | excellent | excellent | excellent | excellent | poor | | excellent |
| | Highest concentration (vol%) of ethyl acetate in 2-propanol/ethyl acetate for which film whitening did not occur when solvent dripped | 38 | 38 | 30 | 30 | 38 | 50 | | 40 |
| | Determination of solvent resistance | good | good | poor | poor | good | excellent | | excellent |

[Measurement of Heat Shrinkage Rate]

The heat shrinkage rate was measured by the method described below, and the TD heat shrinkage performance and the MD size change resistance performance were evaluated in accordance with the criteria indicated below.

(1) A test piece having an MD width of 100 mm and a TD width of 100 mm was cut out from a stretched film.

(2) This sample piece was completely immersed in 100° C. hot water for 10 seconds, thereafter removed and immediately water-cooled. After the sample piece was water-cooled, the moisture was fully wiped away, and the TD length L (mm) and the MD length M (mm) were measured.

(3) The heat shrinkage rates were computed by the following expressions, and the digits after the decimal point were rounded up to obtain integer values.

TD heat shrinkage rate (%)={(100−L)/100}×100

MD heat shrinkage rate (%)={(100−M)/100}×100

The heat shrinkage rates when immersed in 70° C., 80° C. and 90° C. hot water were also measured in a manner similar to the above-described method.

(i) Determination of TD Heat Shrinkage Performance

Excellent: The heat shrinkage rate at 100° C. is at least 60%.

Good: The heat shrinkage rate at 100° C. is at least 50% and less than 60%.

Poor: The heat shrinkage rate at 100° C. is less than 50%.

(ii) Determination of MD Size Change Resistance Performance

In the MD direction, there are cases of expansion, so absolute values were used for the evaluation (the first decimal place was rounded off).

Excellent: The absolute value of the shrinkage rate at the temperature at which the absolute value is the greatest among the heat shrinkage rates at 70° C., 80° C., 90° C. and 100° C. is 0-1%.

Good: The absolute value of the shrinkage rate at the temperature at which the absolute value is the greatest among the heat shrinkage rates at 70° C., 80° C., 90° C. and 100° C. is 2-3%.

Poor: The absolute value of the shrinkage rate at the temperature at which the absolute value is the greatest among the heat shrinkage rates at 70° C., 80° C., 90° C. and 100° C. is at least 4%.

[Measurement of Tensile Modulus and Tensile Elongation]

The tensile modulus and the tensile elongation were measured by the method described below, and the physical properties of the film were evaluated in accordance with the criteria indicated below.

(1) A strip-shaped sample piece having an MD width of 100 mm and a TD width of 10 mm was cut out from a stretched film.

(2) A Tensilon universal material tester, manufactured by Orientec Co., Ltd., was used to apply, to the sample piece that was cut out, tensile stress in the MD at a measurement temperature of 23° C. and a tension rate of 200 mm/min, and the tensile modulus was computed from the stress-strain curve and the cross-sectional area of the sample piece. The tensile elongation was computed on the basis of the displacement when the film broke.

(i) Determination of Film Rigidity

Excellent: The MD tensile modulus is at least 1000 MPa.

Good: The MD tensile modulus is at least 800 MPa and less than 1000 MPa.

Poor: The MD tensile modulus is less than 800 MPa.

(ii) Determination of Film Strength

Excellent: The MD tensile elongation is at least 400%.

Good: The MD tensile elongation is at least 200% and less than 400%.

Poor: The MD tensile elongation is less than 200%.

[Measurement of Total Light Transmittance and Haze]

The total light transmittance and the haze were measured by the method described below, and the transparency was evaluated in accordance with the criteria indicated below.

(1) A sample piece having an MD width of 50 mm and a TD width of 100 mm was cut out from a stretched film.

(2) An NDH2000 turbidity meter, manufactured by Nippon Denshoku Industries Co., Ltd., was used to measure the total light transmittance and the haze of the film.

Excellent: The haze of the film is less than 7%.

Good: The haze of the film is at least 7% and less than 10%.

Poor: The haze of the film is at least 10%.

[Measurement of Solvent Resistance]

The solvent resistance was measured by the method described below, and the solvent resistance was evaluated in accordance with the criteria indicated below.

(1) A sample piece having an MD width of 300 mm and a TD width of 300 mm was cut out and placed on a glass plate.

(2) Mixed solvents with different 2-propanol/ethyl acetate volume mixing ratios were prepared and 0.05 ml thereof were dripped onto the film by using a dropper in an environment at 23° C. and with a humidity of 50%.

(3) After the mixed solvents that were dripped completely evaporated and disappeared, the appearance of the film was checked visually and the maximum concentration of the ethyl acetate in which whitening of the film was not observed was recorded as the measurement value.

Excellent: The maximum ethyl acetate concentration in 2-propanol/ethyl acetate in which film whitening did not occur was at least 45 vol %.

Good: The maximum ethyl acetate concentration in 2-propanol/ethyl acetate in which film whitening did not occur was at least 35 vol % and less than 45 vol %.

Poor: The maximum ethyl acetate concentration in 2-propanol/ethyl acetate in which film whitening did not occur was less than 35 vol %.

In Examples 1 to 7, the MD heat shrinkage rate at 70-100° C. was within the range ±2%, and the size change in the longitudinal direction was small, whereas the results for Comparative Examples 1 to 5 and 8 fell considerably outside the aforementioned range. This is inferred to be due to the fact that, by forming the structures of the block copolymer composition in the present embodiment, lamellar microphase separation structures parallel to the direction orthogonal to the stretching direction contributing mainly to the heat shrinkage in the heat-shrink films were obtained. Furthermore, it can be understood that Examples 1 to 7 have excellent film strength and transparency, as well as having sufficient resistance to chemical attacks by diluting solvents for ink.

Conversely, in Comparative Examples 1 to 5, the results were inferior to those of Examples 1 to 7 even in terms of the resistance to chemical attacks by diluting solvents for ink. Additionally, Comparative Example 6 had inferior transparency and heat shrinkage performance in the TD direction, as well as not being able to obtain a film having rigidity suitable for use. Comparative Example 7 was high in softness and did not allow a stretched film to be manufactured. From the above, it can be understood that the block copolymers in the present embodiment are materials having excellent various physical properties that are sought in shrink films, having better shrink finish properties, which are the greatest characteristics of the present invention, and furthermore, also having excellent solvent resistance against diluting solvents for ink.

INDUSTRIAL APPLICABILITY

The block copolymer composition of the present invention has properties wherein the size changes in the longitudinal direction at the time of shrink packaging are stably small in the temperature range used at the time of attachment and the elasticity of the film does not tend to decrease after printing. Thus, films using this material can be used as various types of packaging films such as those for bottle labels, cap seals, and the like. Additionally, when the block copolymer composition of the present invention is used as a sheet, it has excellent various physical properties and thus can be favorably used in food containers, blister packs, and the like.

The invention claimed is:

1. A block copolymer composition containing at least one type of block copolymer component obtained by using a vinyl aromatic hydrocarbon and a conjugated diene, wherein the block copolymer composition satisfies the following conditions (1) to (3):
    (1) having a weight-average molecular weight of at least 100000 and at most 300000, and a conjugated diene content of at least 18 mass % and at most 35 mass %;
    (2) having a vinyl aromatic hydrocarbon block percentage of at least 80% and at most 100% relative to the total amount of the vinyl aromatic hydrocarbon; and
    (3) including at least 30 mass % and at most 60 mass % of block copolymer components having a conjugated diene content of at least 30 mass %.

2. The block copolymer composition according to claim 1, wherein the at least one type of block copolymer component contains a hard block mainly comprising the vinyl aromatic hydrocarbon and a soft block mainly comprising the conjugated diene.

3. The block copolymer composition according to claim 1, containing a block copolymer component having at least one type of branch chain selected from among the following formulas (i) to (iv):
    (i) X-B-A;
    (ii) X-B-C-A;
    (iii) X-A-B-A; and
    (iv) X-A-B-C-A;
    wherein, in formulas (i) to (iv), X represents a coupling agent, A represents a hard block containing at least 94 mass % vinyl aromatic hydrocarbons, B represents a soft block containing at least 80 mass % conjugated dienes, and C represents a copolymer block containing vinyl aromatic hydrocarbons and conjugated dienes, and not satisfying the conditions of one of A and B.

4. The block copolymer composition according to claim 3, containing a block copolymer component having a branch chain with a conjugated diene content of at least 30 mass %, and a branch chain with a conjugated diene content less than 20 mass %.

5. The block copolymer composition according to claim 1, wherein the vinyl aromatic hydrocarbon is at least one type of vinyl aromatic hydrocarbon selected from the group consisting of vinyl monocyclic aromatic hydrocarbons and derivatives thereof, and vinyl polycyclic aromatic hydrocarbons and derivatives thereof.

6. The block copolymer composition according to claim 1, wherein the vinyl aromatic hydrocarbon is at least one type of vinyl aromatic hydrocarbon selected from the group consisting of vinyl dicyclic aromatic hydrocarbons, vinyl tricyclic aromatic hydrocarbons, and vinyl tetracyclic aromatic hydrocarbons.

7. The block copolymer composition according to claim 1, wherein the vinyl aromatic hydrocarbon is at least one type of vinyl aromatic hydrocarbon selected from the group consisting of styrene, o-methylstyrene, p-methylstyrene, p-tert-butylstyrene, 2,4-dimethylstyrene, 2,5-dimethylstyrene, α-methylstyrene, vinylnaphthalene, and vinylanthracene.

8. The block copolymer composition according to claim 1, wherein the vinyl aromatic hydrocarbon is styrene.

9. The block copolymer composition according to claim 1, wherein the conjugated diene is a C4-C12 diene.

10. The block copolymer composition according to claim 1, wherein the conjugated diene is at least one type of conjugated diene selected from the group consisting of C4-C10 dienes, C4-C8 dienes, and C4-C6 dienes.

11. The block copolymer composition according to claim 1, wherein the conjugated diene is at least one type of conjugated diene selected from the group consisting of 1,3-butadiene (butadiene), 2-methyl-1,3-butadiene (isoprene), 1,3-pentadiene, 2,3-dimethyl-1,3-butadiene, and 1,3-hexadiene.

12. The block copolymer composition according to claim 1, wherein the conjugated diene is 1,3-butadiene (butadiene).

13. A heat-shrink film obtained by using the block copolymer composition according to claim 1.

14. A package provided with the heat-shrink film according to claim 13.

* * * * *